Figure 1:
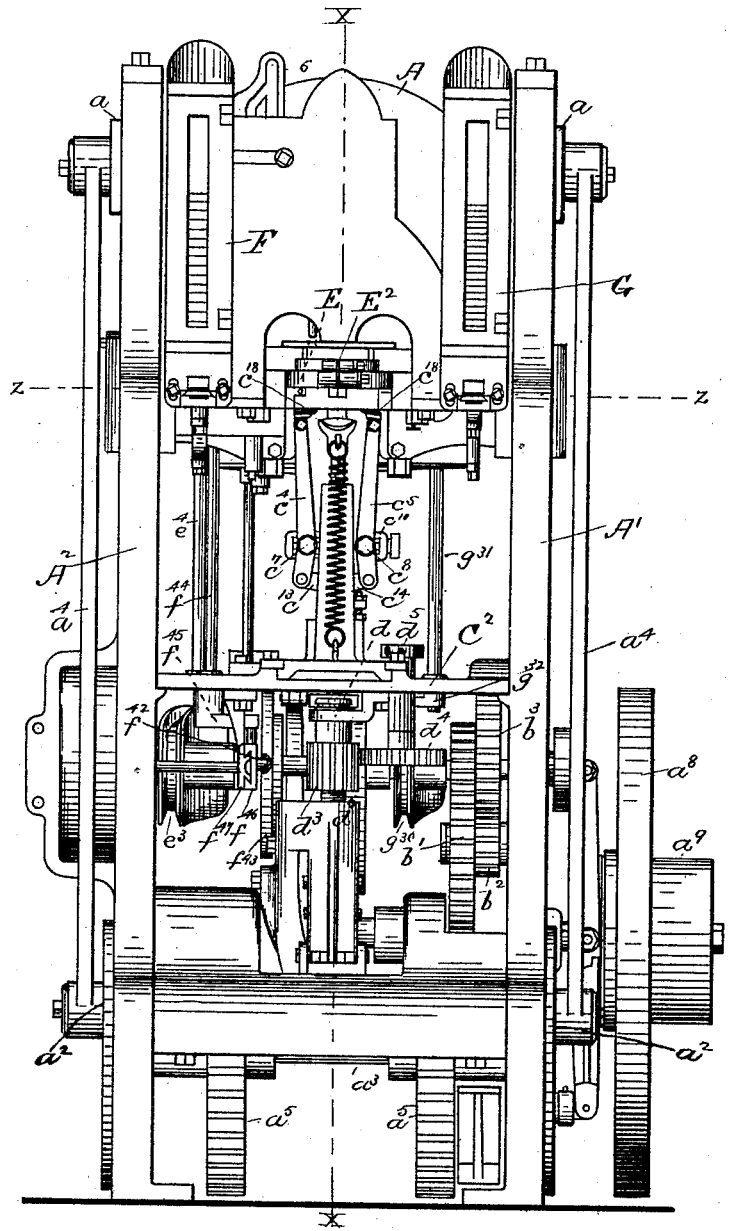

(No Model.)  24 Sheets—Sheet 1.

F. F. RAYMOND, 2d.
HEEL NAILING MACHINE.

No. 464,991.  Patented Dec. 15, 1891.

WITNESSES.

INVENTOR.

(No Model.) 24 Sheets—Sheet 4.

F. F. RAYMOND, 2d.
HEEL NAILING MACHINE.

No. 464,991. Patented Dec. 15, 1891.

WITNESSES.
J. M. Dolan
Fred. B. Dolan

INVENTOR
F. F. Raymond (No Model.) 24 Sheets—Sheet 6.

F. F. RAYMOND, 2d.
HEEL NAILING MACHINE.

No. 464,991. Patented Dec. 15, 1891.

WITNESSES.
J. N. Dolan
Fred. B. Dolan.

INVENTOR.
F. F. Raymond (No Model.) 24 Sheets—Sheet 7.

F. F. RAYMOND, 2d.
HEEL NAILING MACHINE.

No. 464,991. Patented Dec. 15, 1891.

WITNESSES.  INVENTOR.

(No Model.) 24 Sheets—Sheet 8.

F. F. RAYMOND, 2d.
HEEL NAILING MACHINE.

No. 464,991. Patented Dec. 15, 1891.

WITNESSES.
J. M. Dolan
Fred. B. Dolan

INVENTOR.

(No Model.) 24 Sheets—Sheet 9.

F. F. RAYMOND, 2d.
HEEL NAILING MACHINE.

No. 464,991. Patented Dec. 15, 1891.

WITNESSES.
J. M. Dolan.
Fred. B. Dolan.

INVENTOR.
F. F. Raymond (No Model.) 24 Sheets—Sheet 10.

F. F. RAYMOND, 2d.
HEEL NAILING MACHINE.

No. 464,991. Patented Dec. 15, 1891.

WITNESSES.
J. N. Dolan
Fred. B. Dolan

INVENTOR.
F. F. Raymond (No Model.) 24 Sheets—Sheet 11.

F. F. RAYMOND, 2d.
HEEL NAILING MACHINE.

No. 464,991. Patented Dec. 15, 1891.

WITNESSES.
INVENTOR.

(No Model.) 24 Sheets—Sheet 12.

F. F. RAYMOND, 2d.
HEEL NAILING MACHINE.

No. 464,991. Patented Dec. 15, 1891.

WITNESSES. INVENTOR.

(No Model.) 24 Sheets—Sheet 15.
F. F. RAYMOND, 2d.
HEEL NAILING MACHINE.
No. 464,991. Patented Dec. 15, 1891.
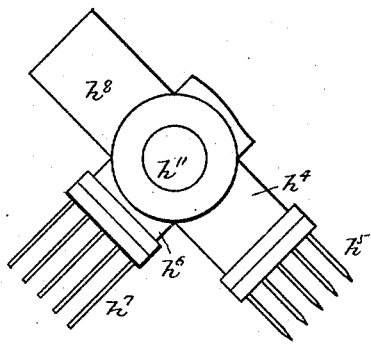
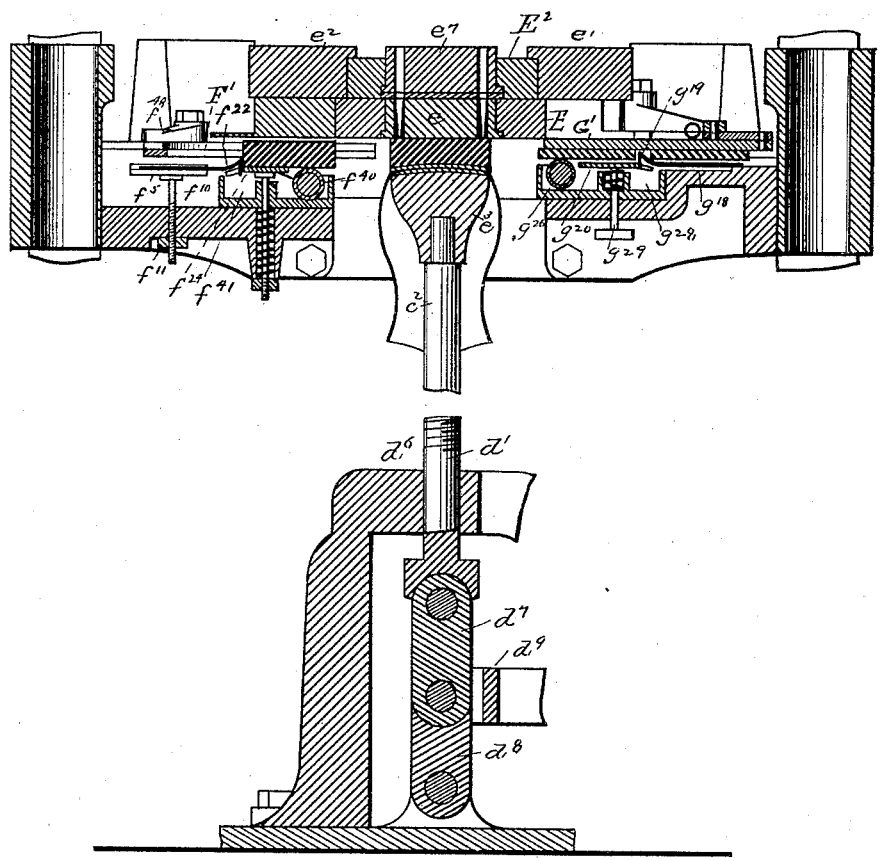
Fig. 19.

(No Model.)  24 Sheets—Sheet 16.

F. F. RAYMOND, 2d.
HEEL NAILING MACHINE.

No. 464,991. Patented Dec. 15, 1891.

WITNESSES.  INVENTOR.

(No Model.)  24 Sheets—Sheet 17.

F. F. RAYMOND, 2d.
HEEL NAILING MACHINE.

No. 464,991. Patented Dec. 15, 1891.

WITNESSES.

INVENTOR.

(No Model.) 24 Sheets—Sheet 18.

F. F. RAYMOND, 2d.
HEEL NAILING MACHINE.

No. 464,991. Patented Dec. 15, 1891.

WITNESSES. INVENTOR.

(No Model.) 24 Sheets—Sheet 19.
F. F. RAYMOND, 2d.
HEEL NAILING MACHINE.
No. 464,991. Patented Dec. 15, 1891.
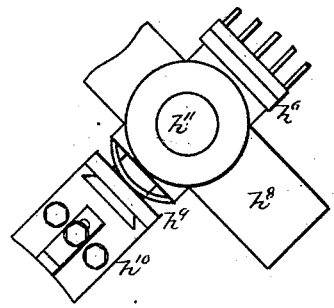
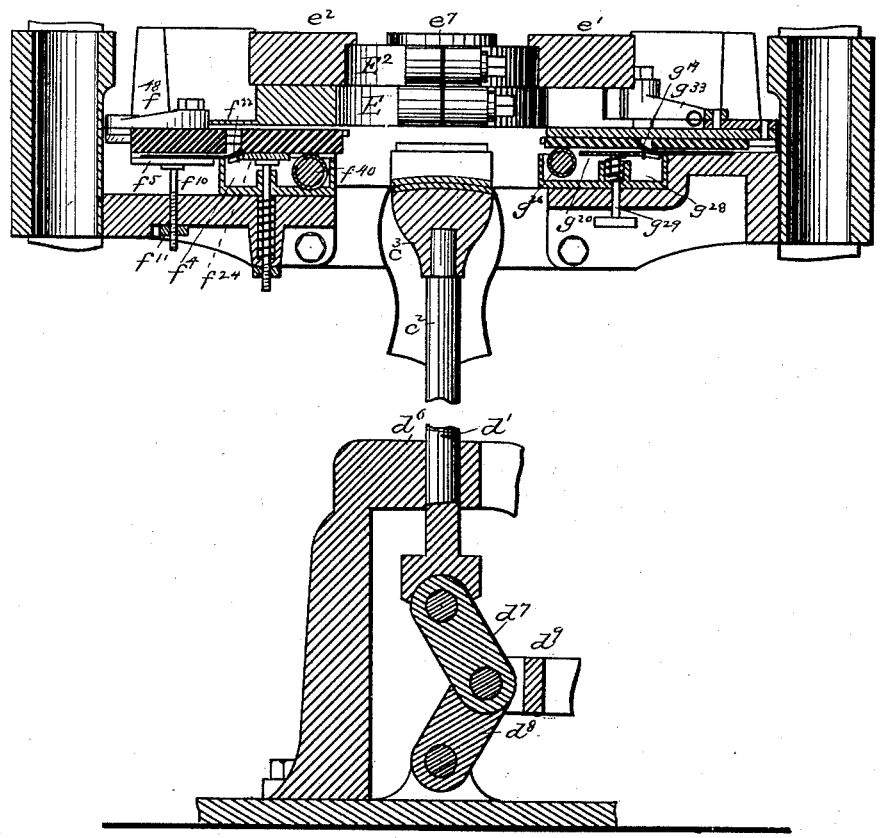
Fig. 23.
WITNESSES INVENTOR (No Model.) 24 Sheets—Sheet 20.
F. F. RAYMOND, 2d.
HEEL NAILING MACHINE.
No. 464,991. Patented Dec. 15, 1891.
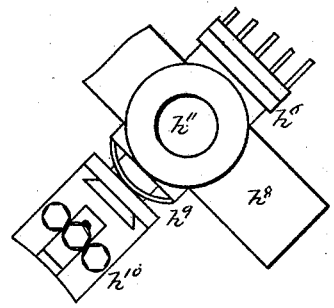
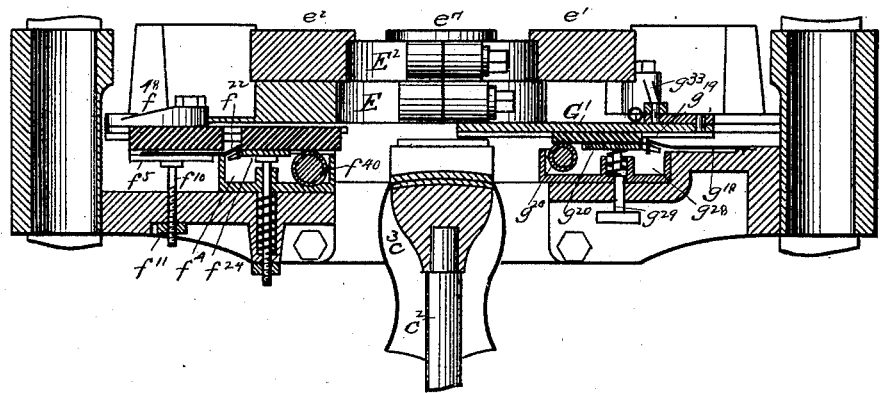
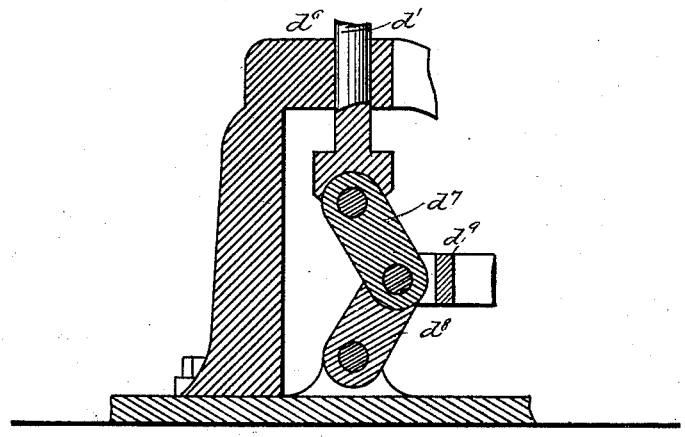
Fig. 24.
WITNESSES. INVENTOR.

(No Model.) 24 Sheets—Sheet 21.

F. F. RAYMOND, 2d.
HEEL NAILING MACHINE.

No. 464,991. Patented Dec. 15, 1891.

WITNESSES.
J. M. Dolan
Fred. B. Dolan.

INVENTOR.

(No Model.) 24 Sheets—Sheet 22.
F. F. RAYMOND, 2d.
HEEL NAILING MACHINE.
No. 464,991. Patented Dec. 15, 1891.
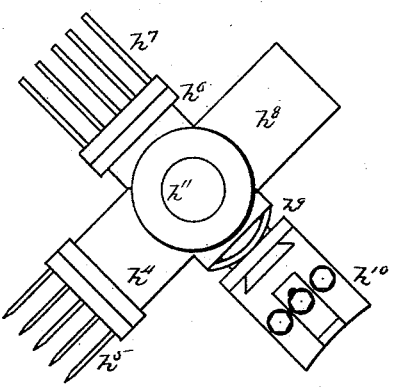
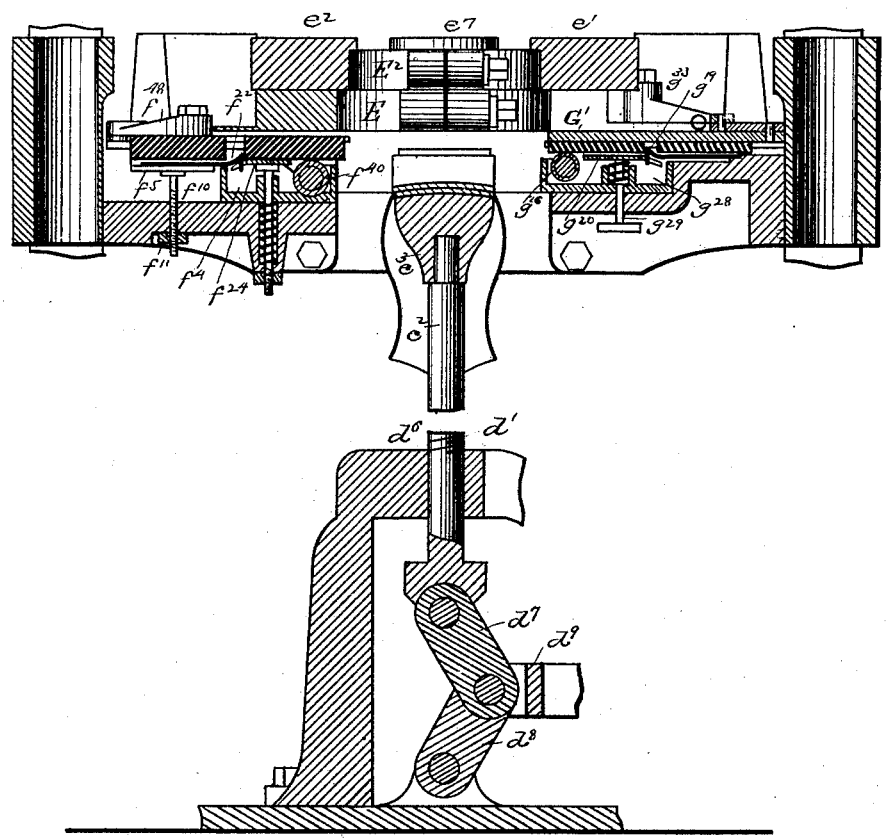
WITNESSES. Fig. 26. INVENTOR.

(No Model.) 24 Sheets—Sheet 23.

F. F. RAYMOND, 2d.
HEEL NAILING MACHINE.

No. 464,991. Patented Dec. 15, 1891.

WITNESSES. INVENTOR.

(No Model.)  24 Sheets—Sheet 24.

F. F. RAYMOND, 2d.
HEEL NAILING MACHINE.

No. 464,991. Patented Dec. 15, 1891.

WITNESSES
J. M. Dolan
Fred. B. Dolan

INVENTOR
F. F. Raymond

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 464,991, dated December 15, 1891.

Application filed April 16, 1887. Serial No. 234,985. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Heel-Nailing Machines, of which the following is a full, clear, and exact description, reference being had to the accompanying drawings, forming a part of this specification, in explaining its nature.

The invention relates to a heel-nailing machine by which heel-blanks and top lifts are automatically fed and attached and the attaching-nails automatically made and the heel-blank breasted; and it comprises a cross-head carrying a revolving head having four arms, one of which supports a gang or group of awls, a second a gang or group of drivers, a third a spanker-face, and the fourth a heel-breasting knife, which head is automatically rotated to bring the awls, drivers, spanker, and breaster successively into operative position, and preferably by devices which operate to rotate the head a quarter-revolution upon the upward movement of the cross-head, so that the revolving head is stationary during its entire downward movement.

It also relates to a templet-plate, which is given a horizontal movement in a suitable bed and the under surface of which acts as an abutment against which the heel-blank is compressed by a vertical movement of the last or work-support in relation thereto.

It further relates to the jack and last or work-support carried thereby, and to a movable head provided with vertical movements to move the jack-spindle toward and from the under surface of the templet.

It further relates to the means for providing this head with vertical movements and periods of rest by means of a cam and connecting devices comprising a lever and a toggle.

It also comprises a heel-blank feed arranged to deliver heel-blanks from a stack automatically, and to devices for applying glue, paste, or other adhesive composition to the heel-seat of the heel-blank as it is fed.

It also relates to devices for feeding top lifts automatically in regular order to a position beneath the templet and for applying glue, paste, or other adhesive substance to their under surface as they are fed.

It further relates to various details of organization and construction, which will hereinafter be described.

Figure 2:
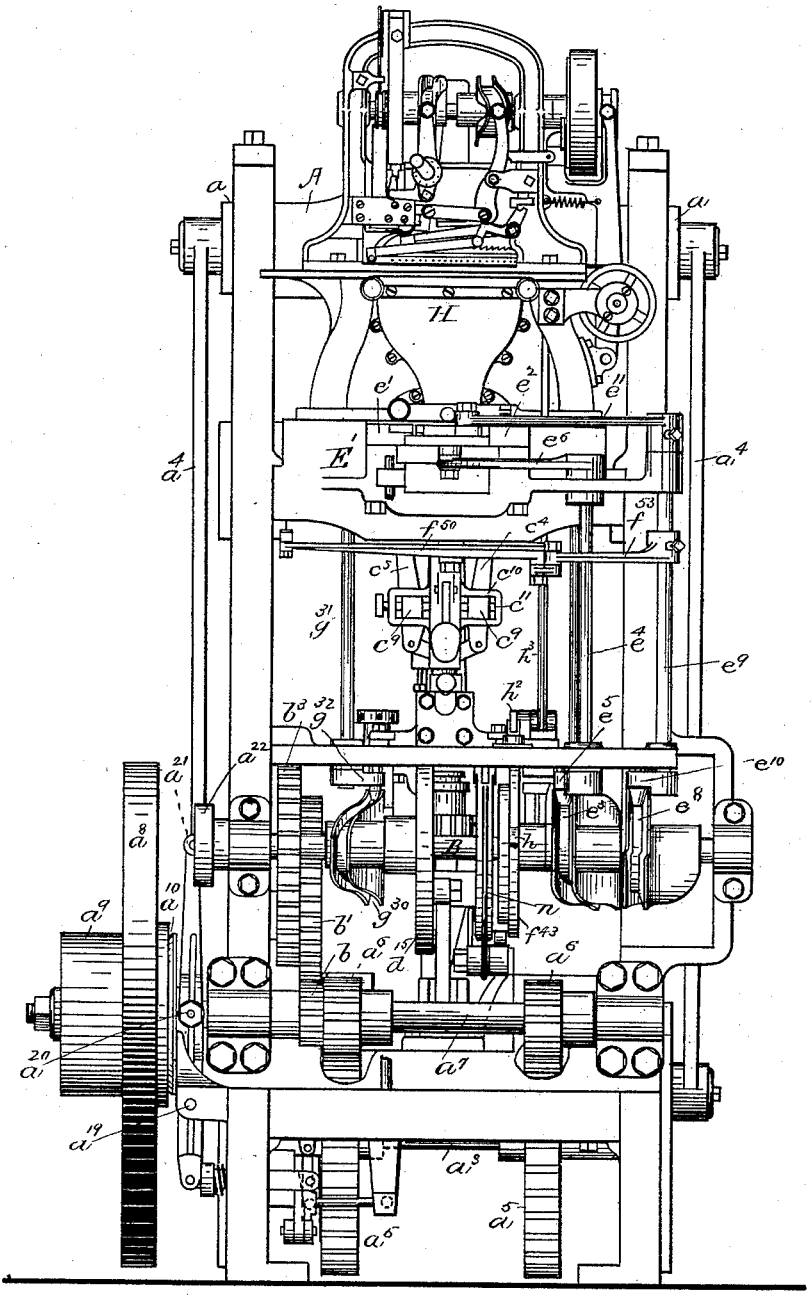
Figure 3:
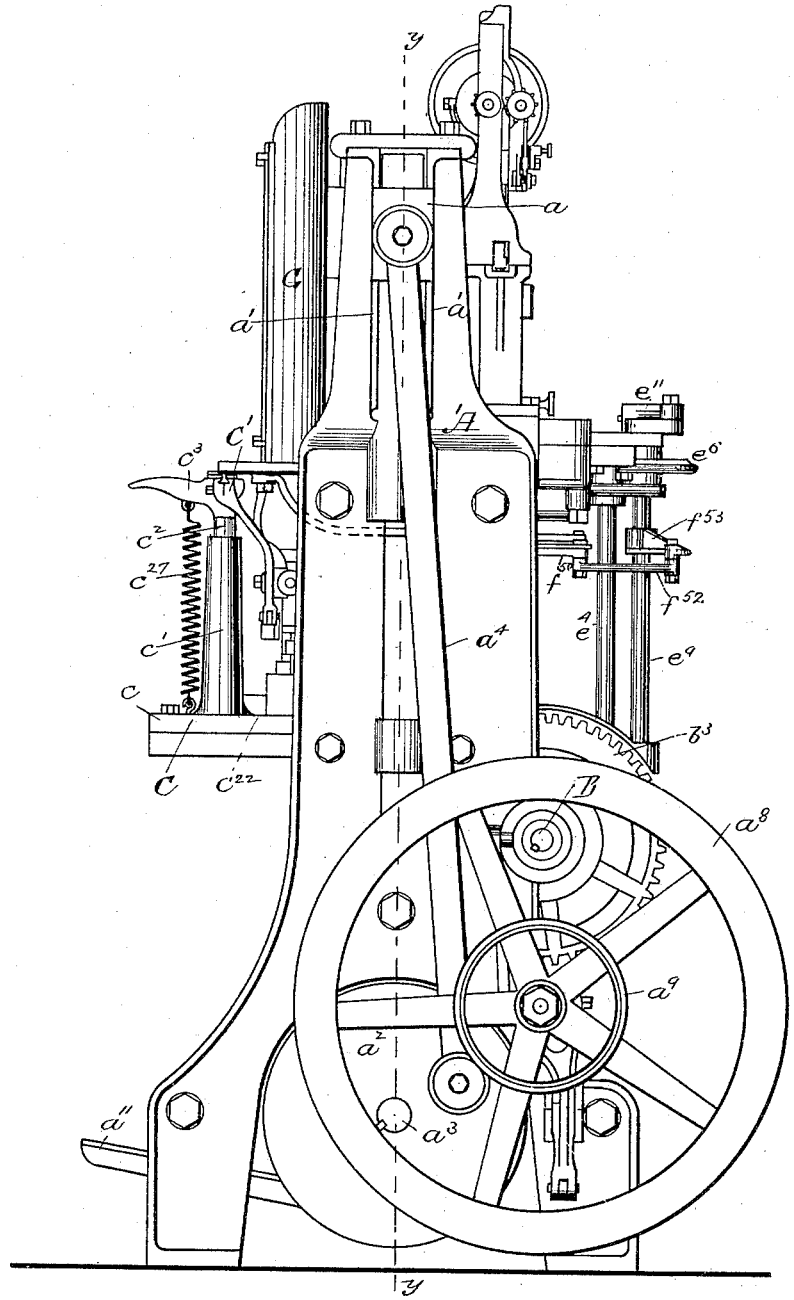
Figure 4:
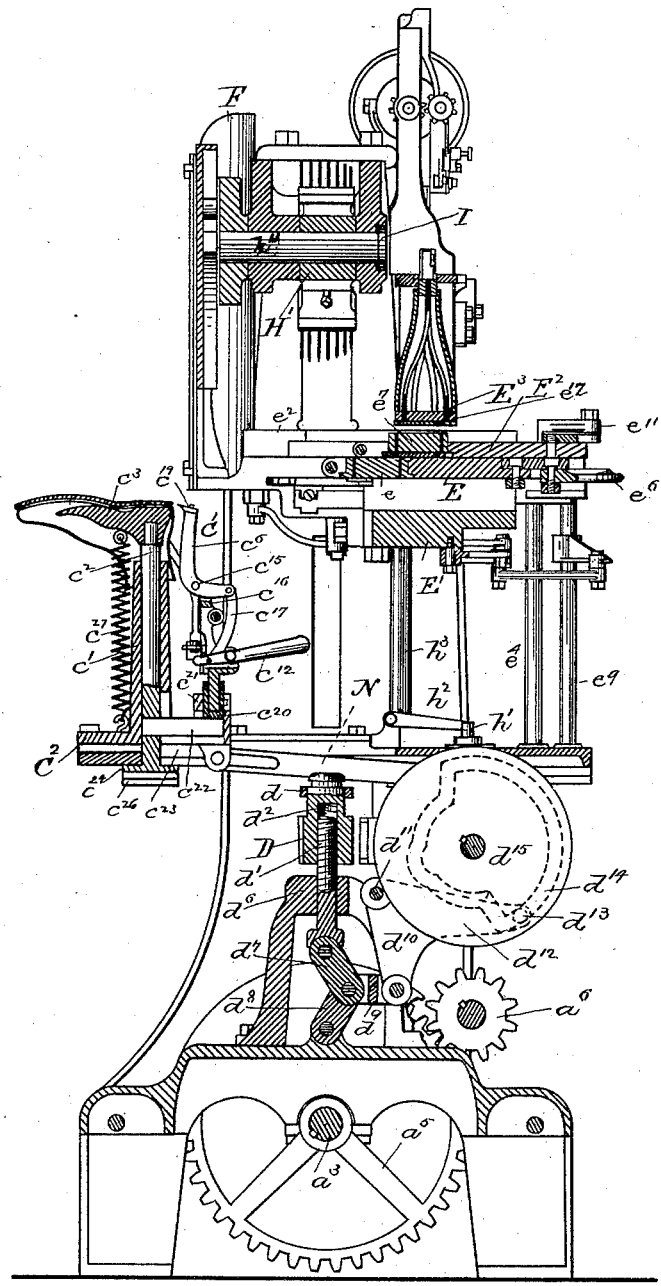
Figure 5:
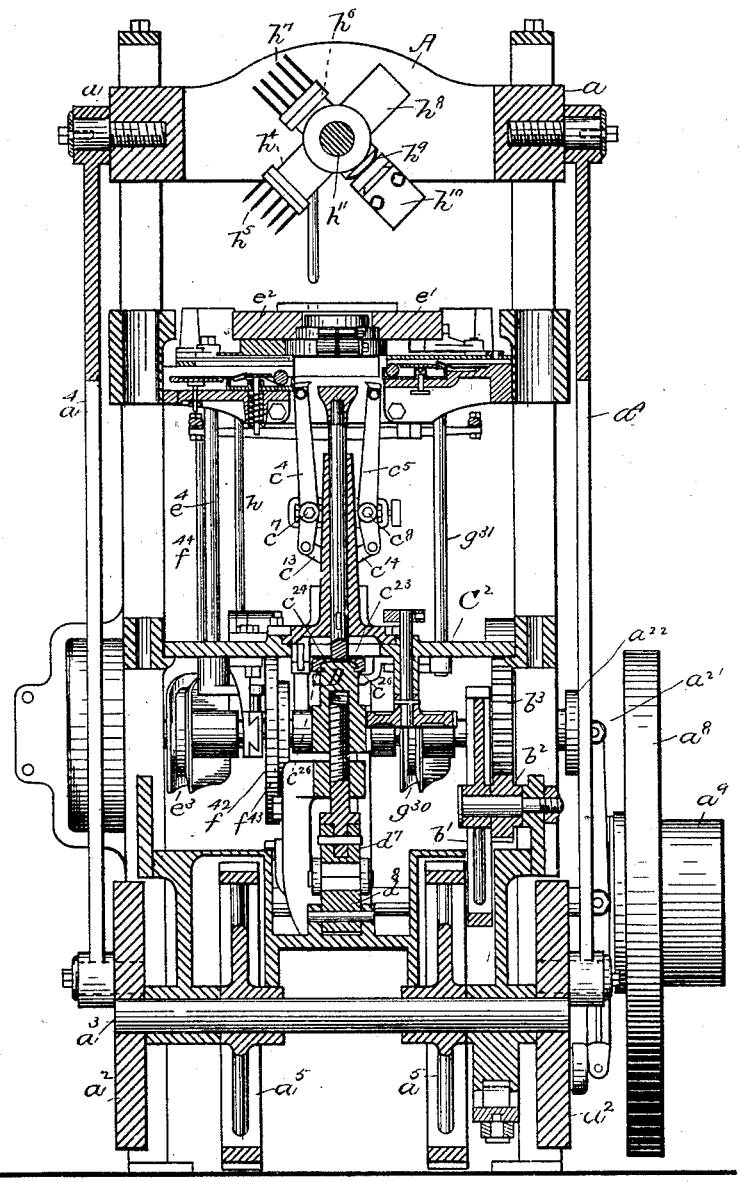
Figure 6:
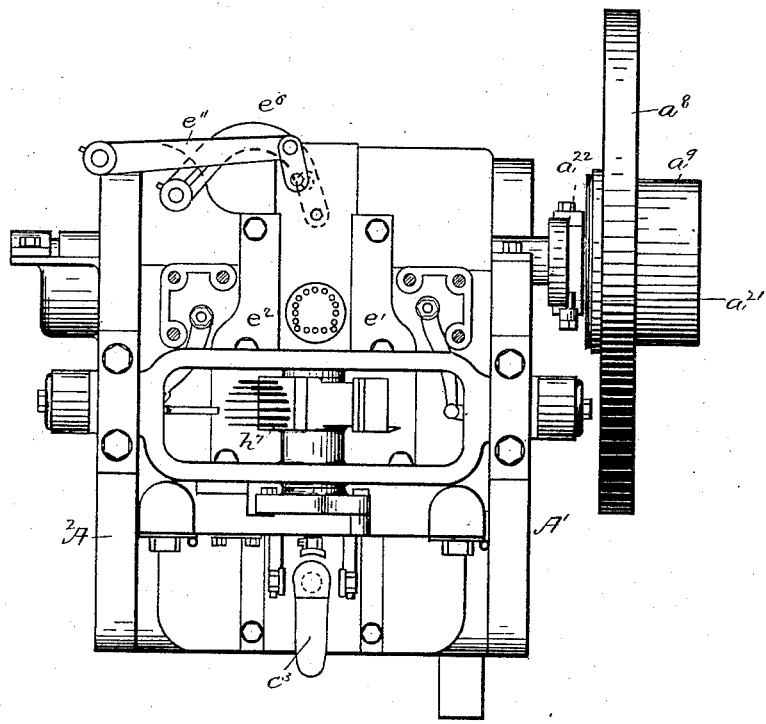
Figure 7:
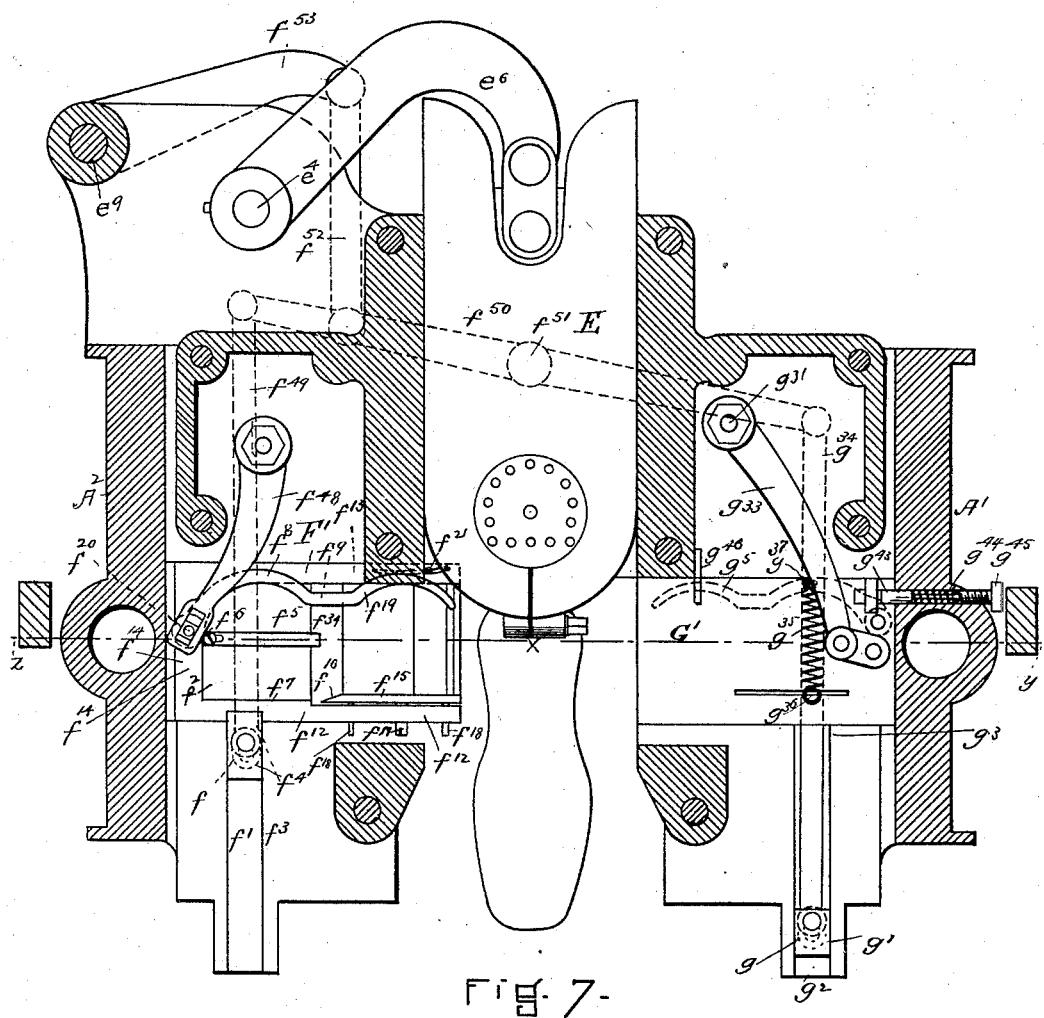
Figure 8:
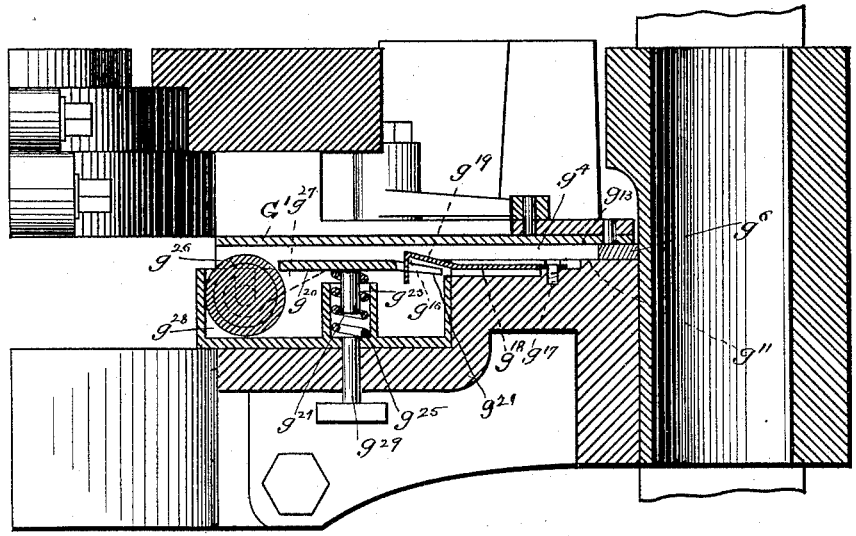
Figure 9:
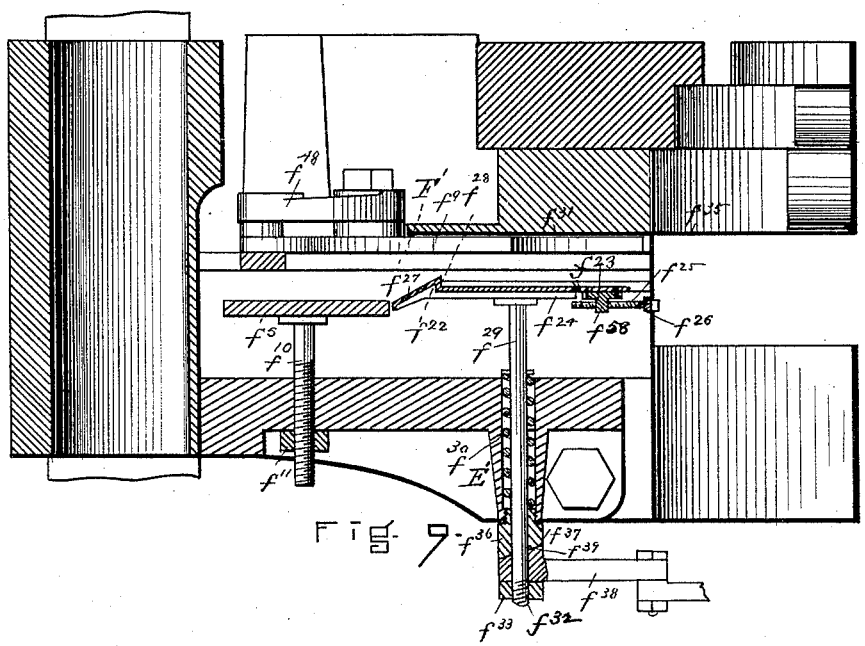
Figure 10:
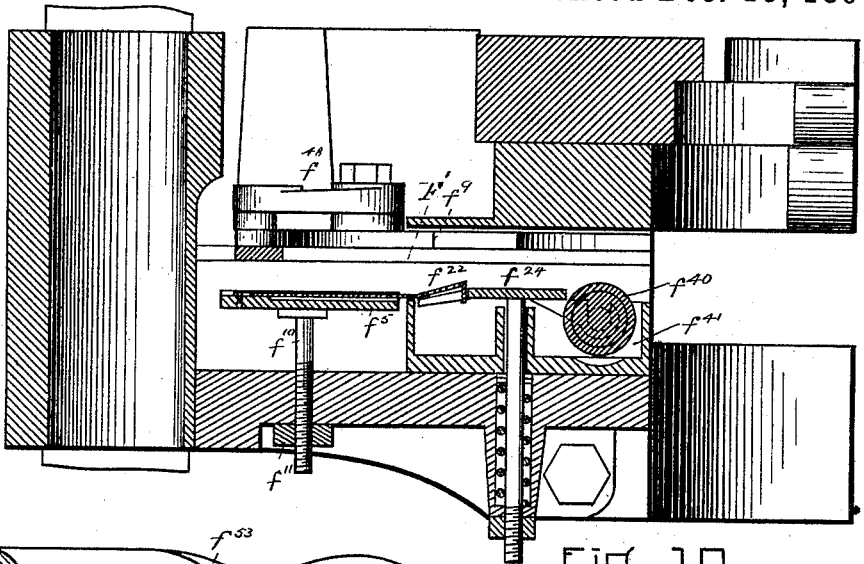
Figure 11:
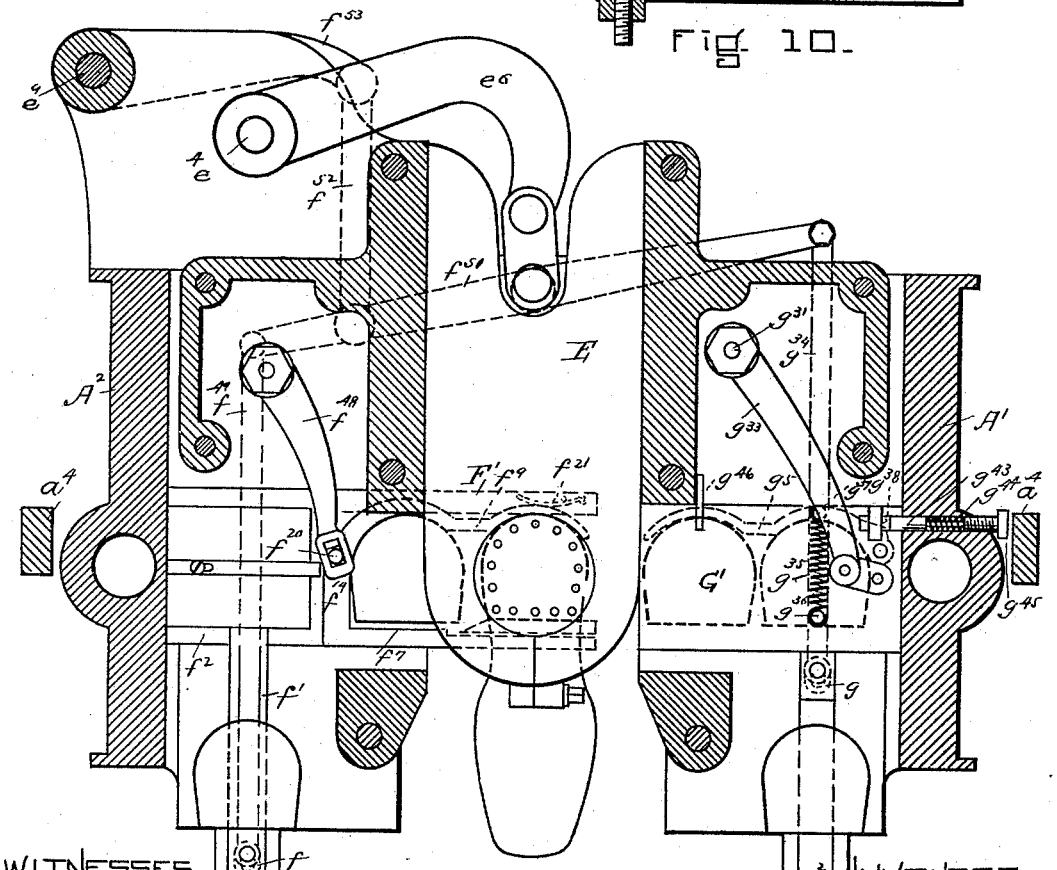
Figure 12:
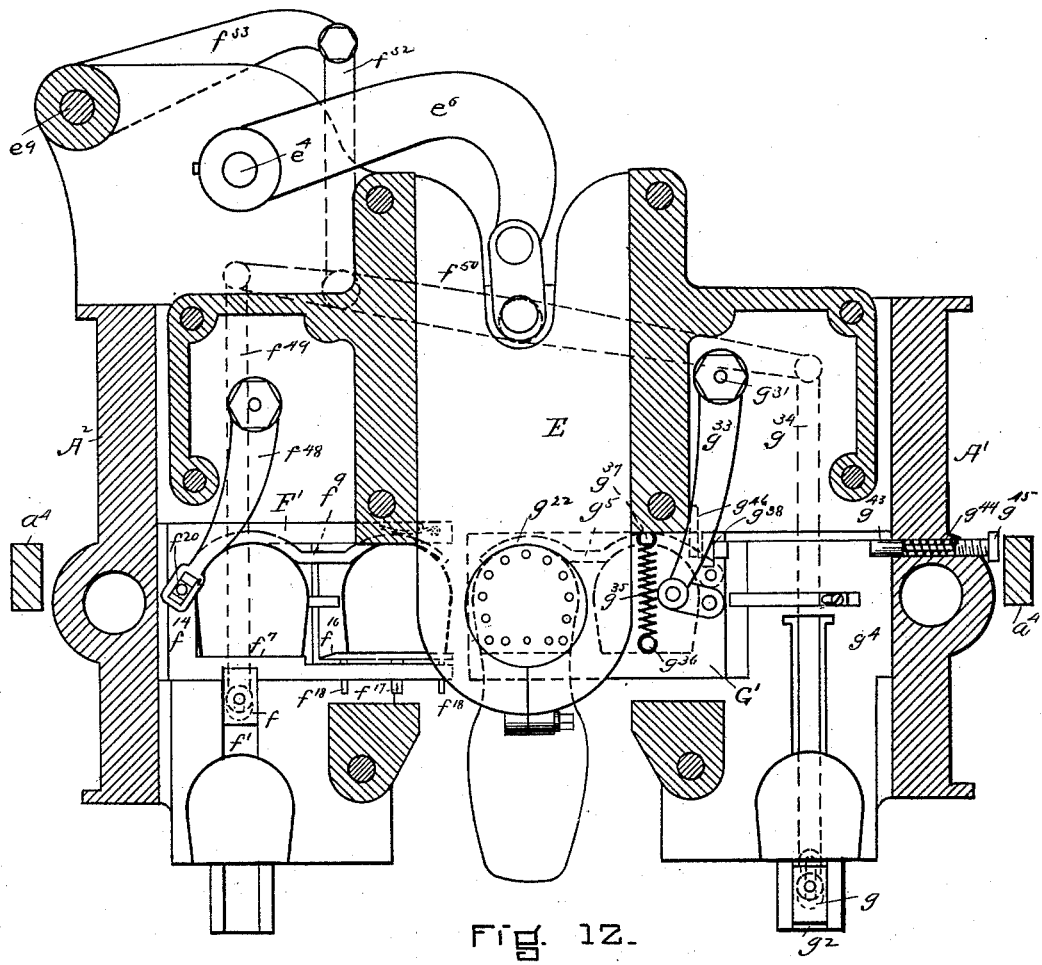
Figures 13, 14:
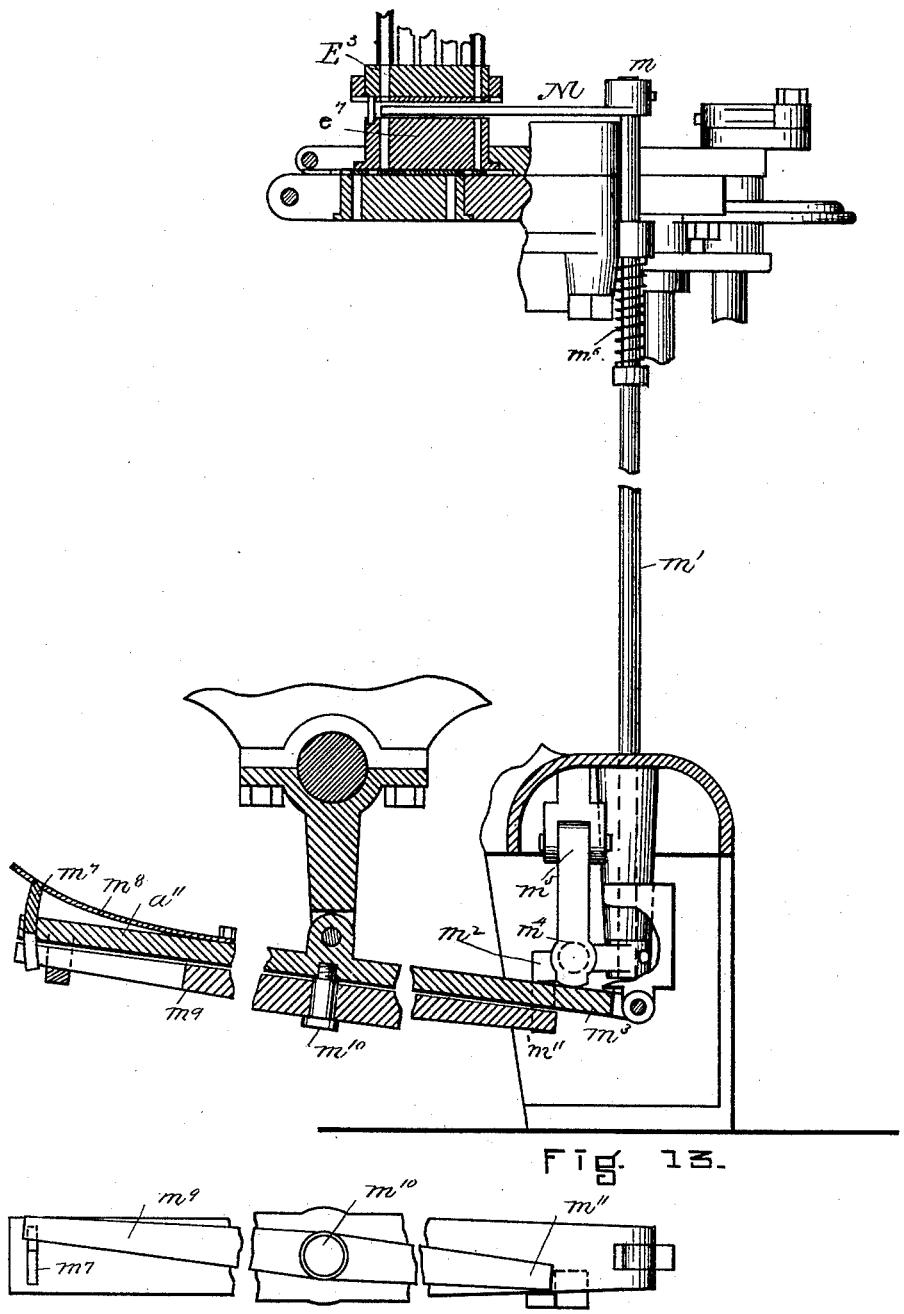
Figure 15:
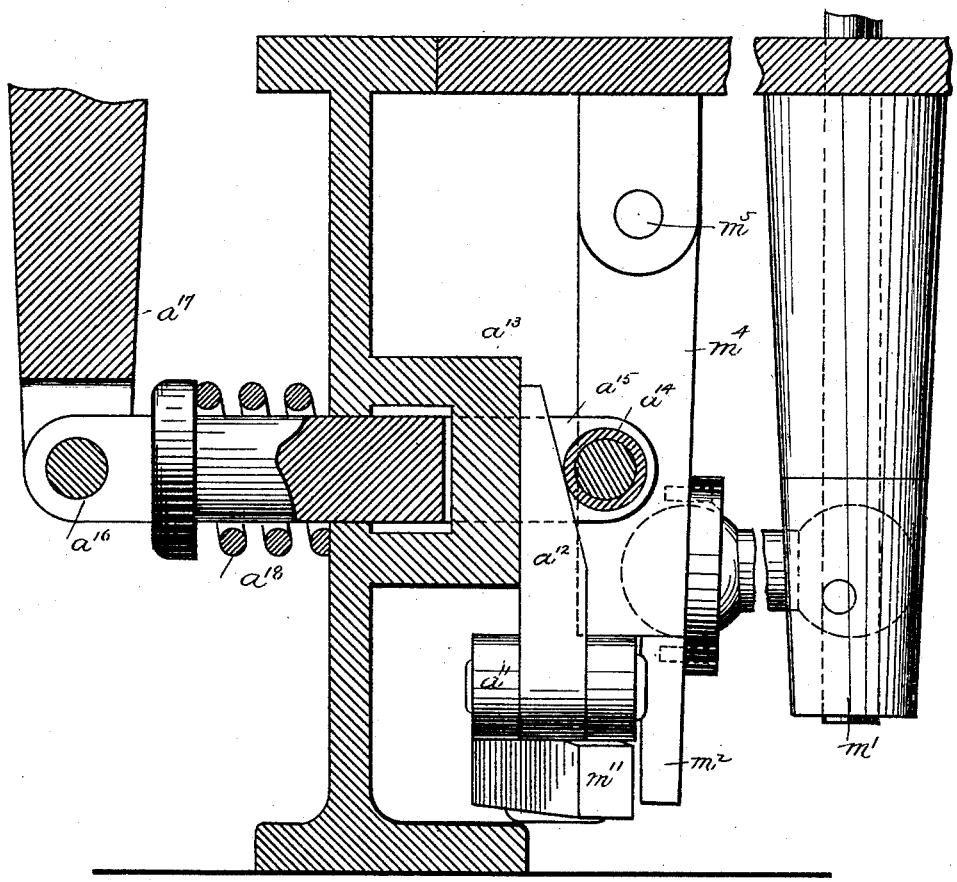
Figure 16:
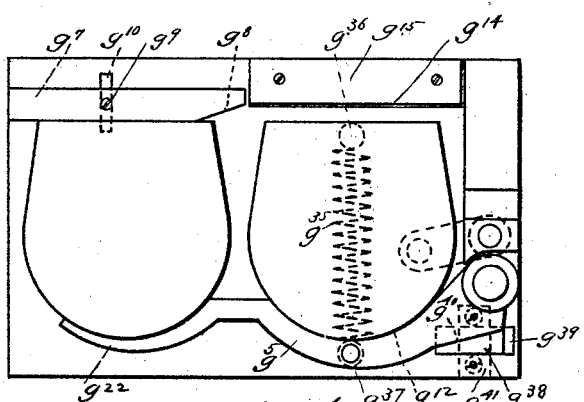
Figure 17:
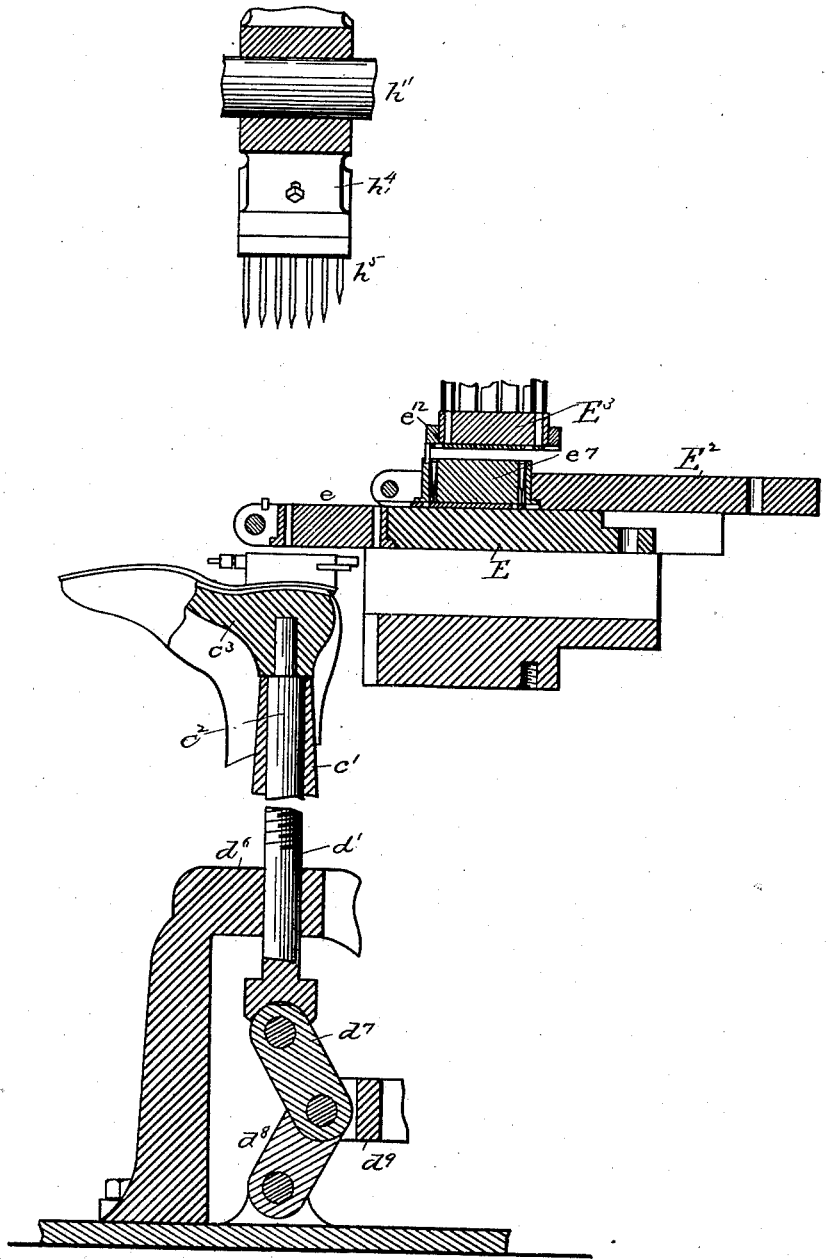
Figure 18:
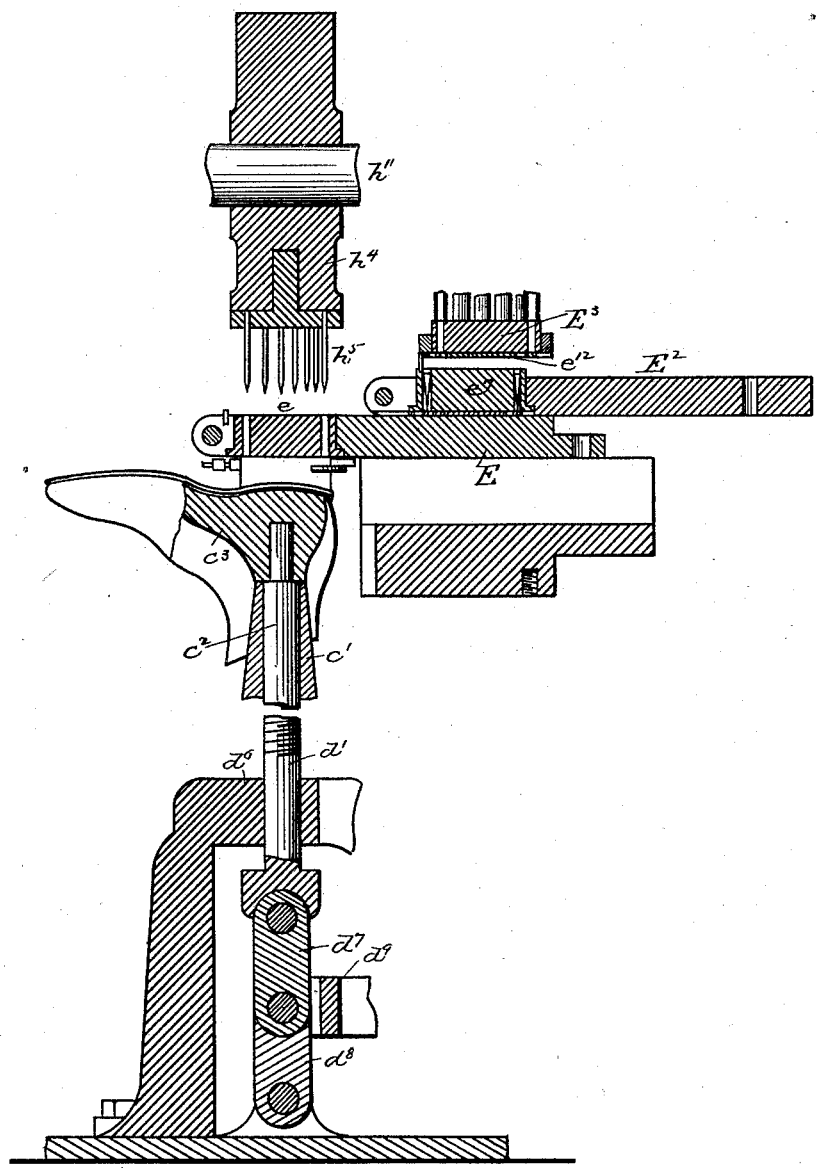
Figure 20:
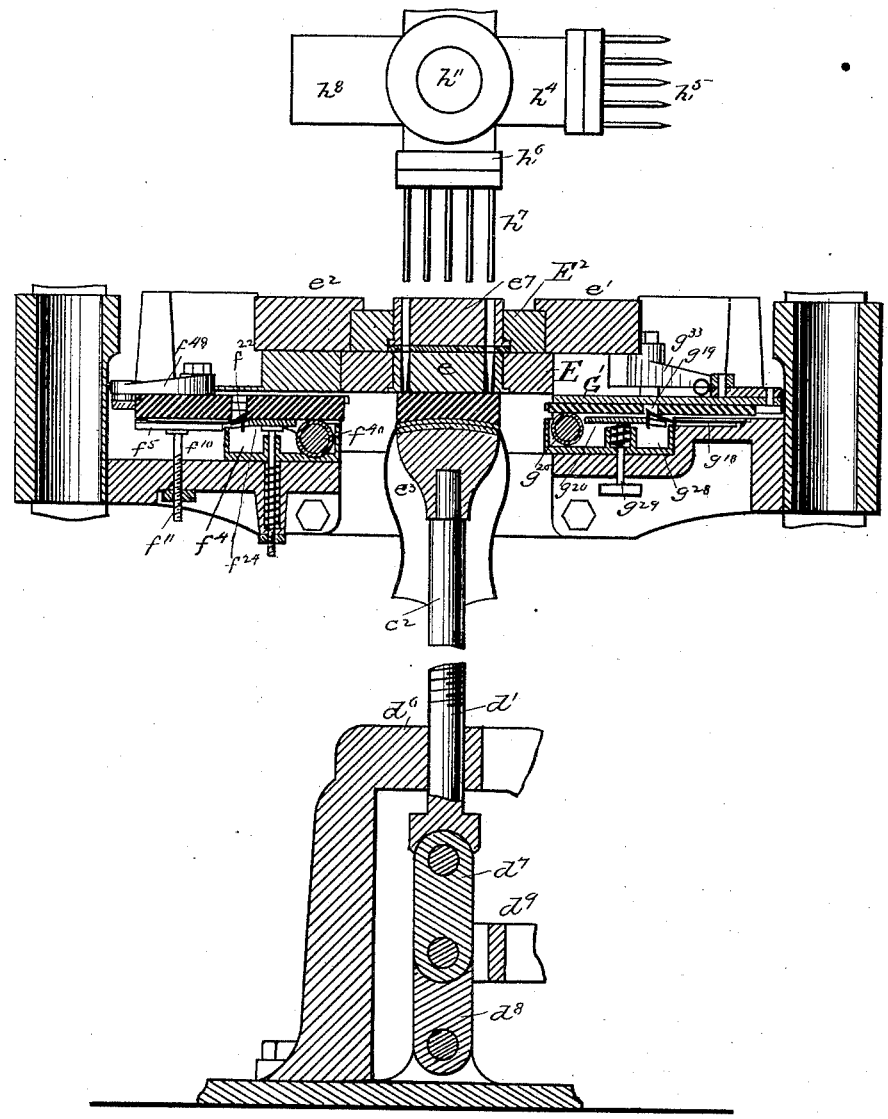
Figure 21:
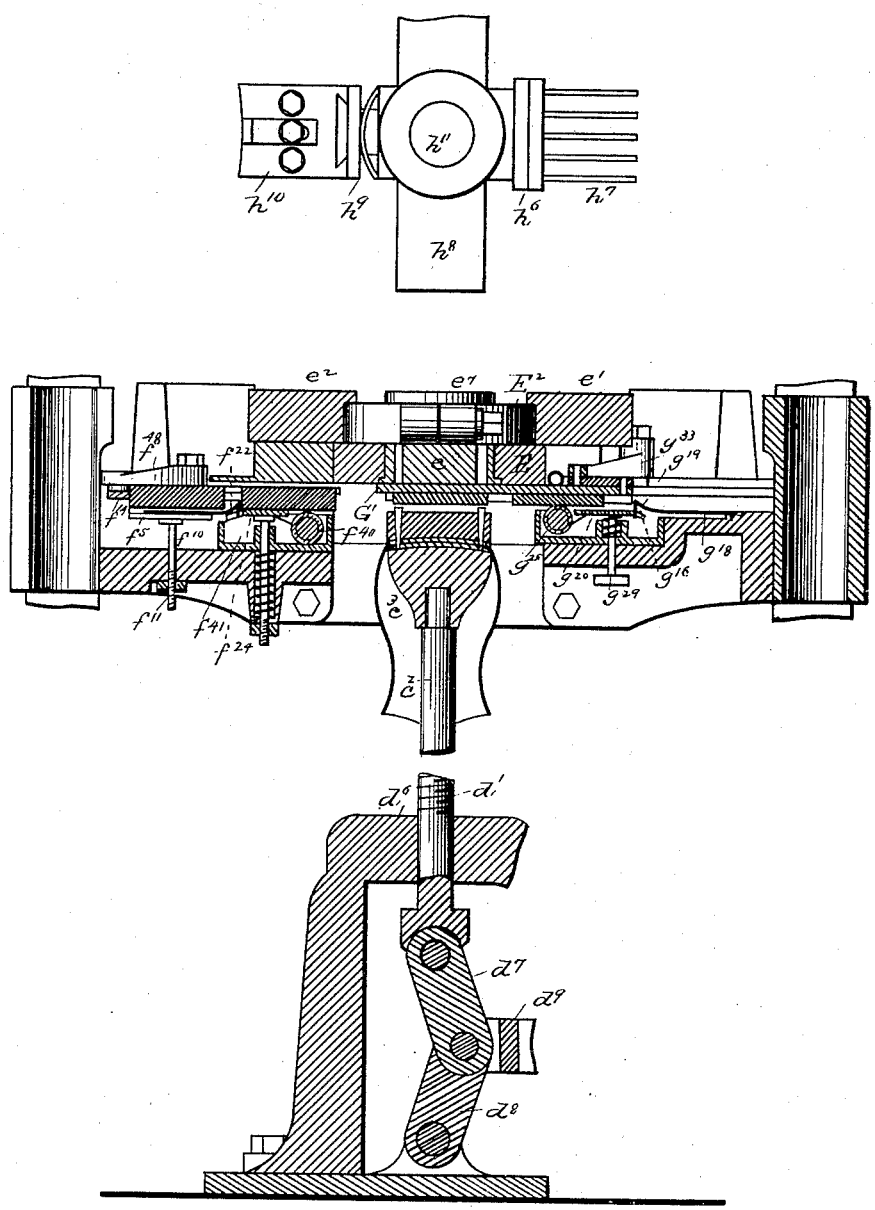
Figure 22:
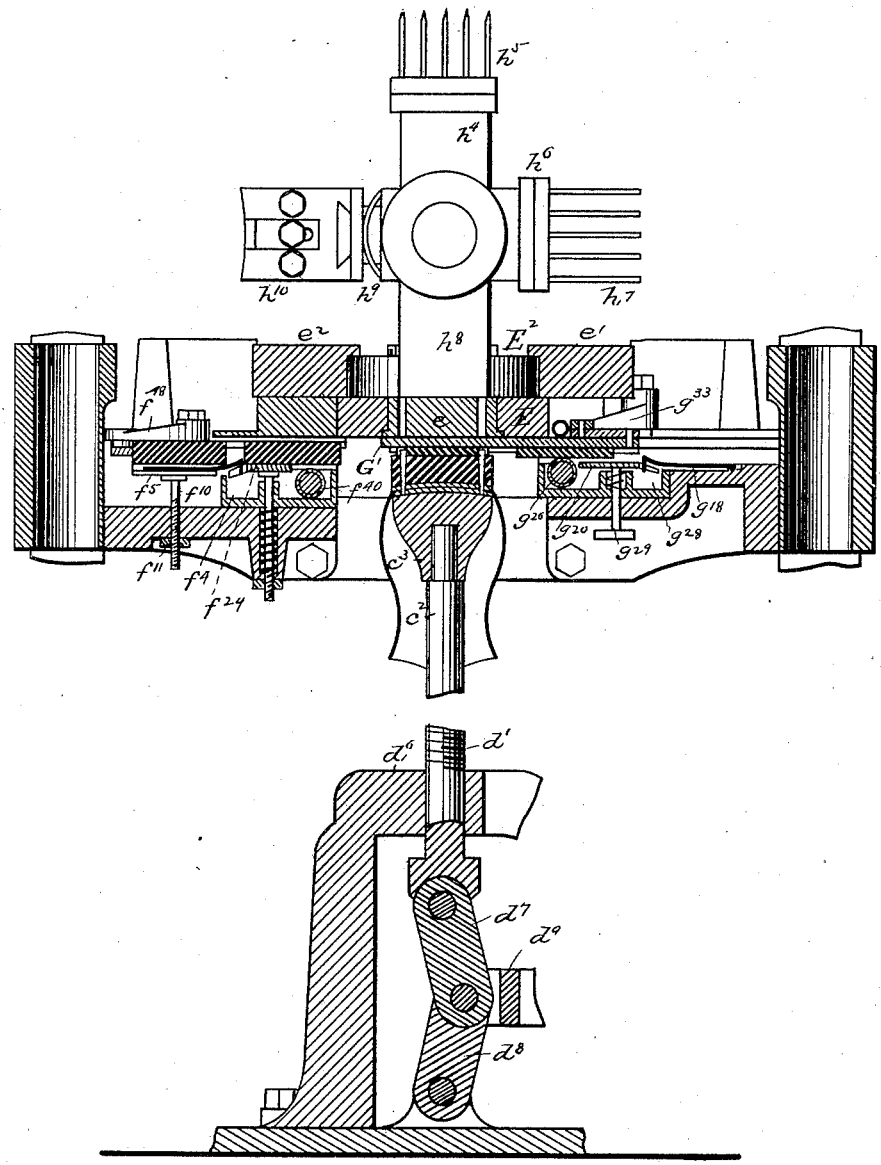
Figure 25:
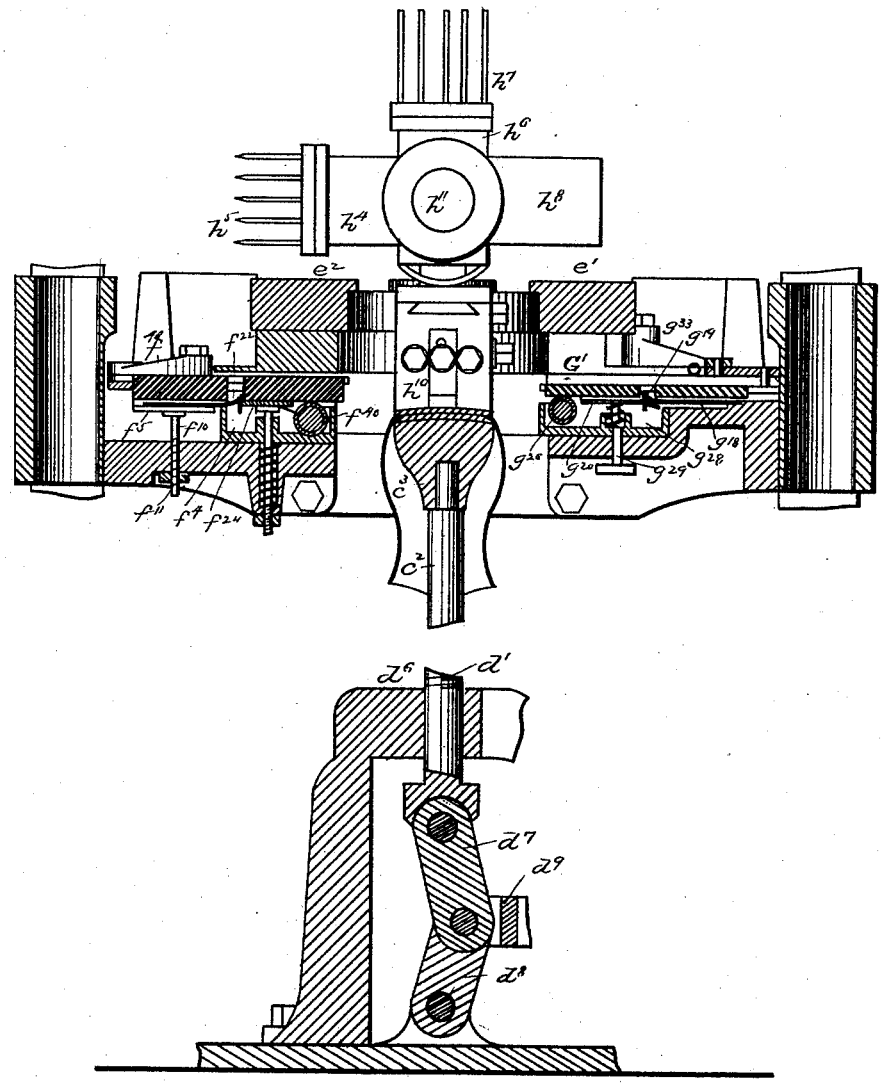
Figure 27:
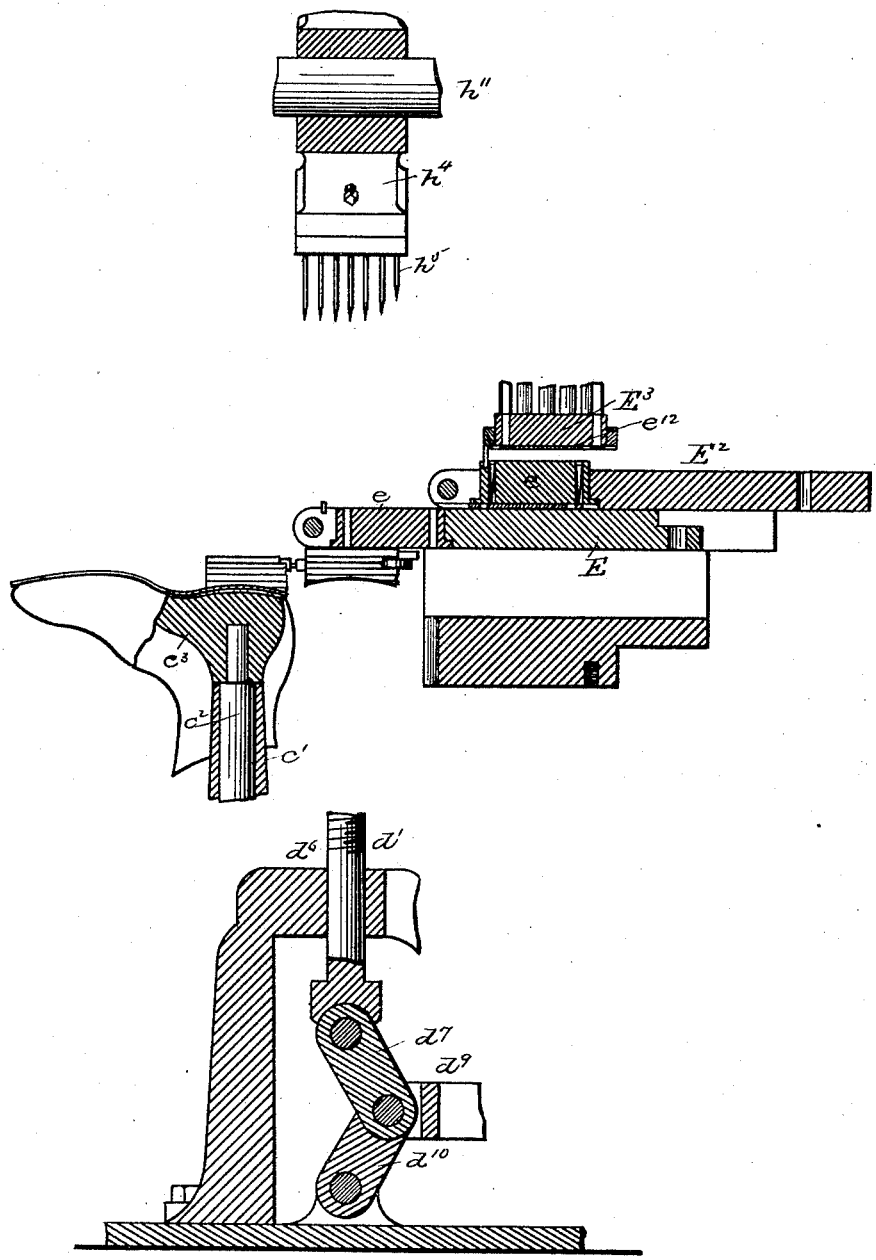
Figure 28:
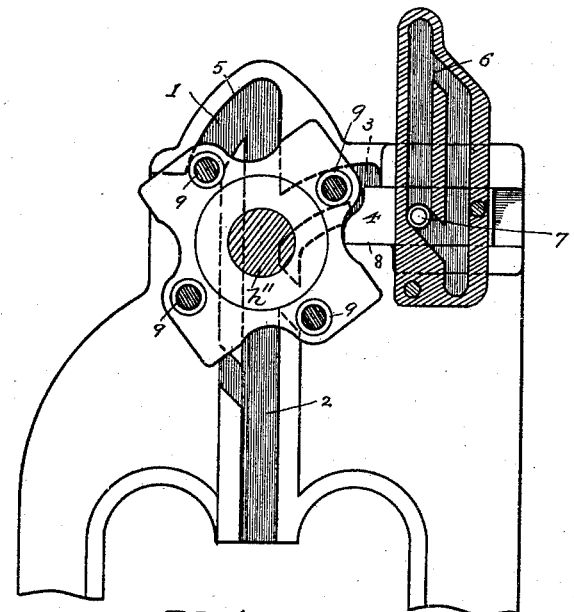
Figure 29:
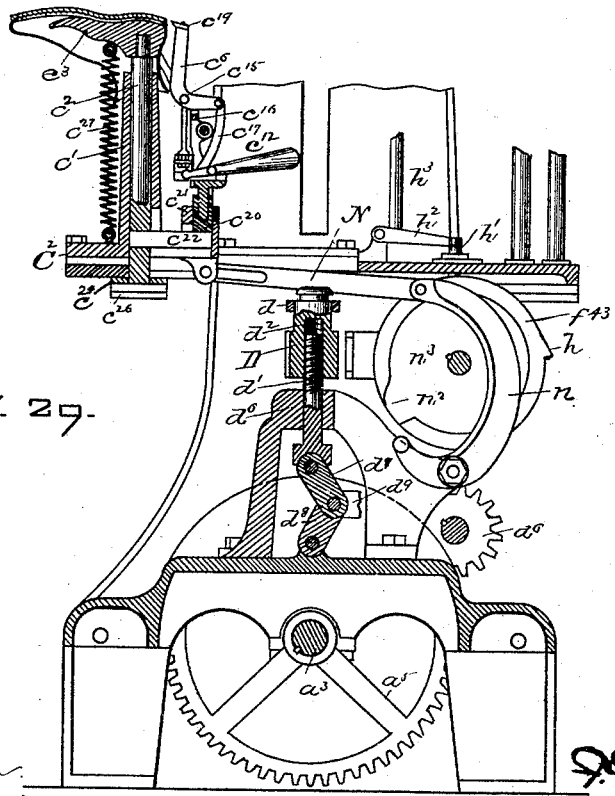

In the drawings, Figure 1 is a view of the machine in front elevation. Fig. 2 is a view of the machine in rear elevation. Fig. 3 is a view of the machine in side elevation. Fig. 4 is a vertical central section on the line $x\ x$ of Fig. 1. Fig. 5 is a vertical cross section upon the line $y\ y$ of Fig. 3. Fig. 6 is a plan view of the machine without the nail-making devices. Fig. 7 is a horizontal section, enlarged, upon the line $z\ z$ of Fig. 1. Fig. 8 is an enlarged view in cross-section on the line $x\ y$ of Fig. 7. Fig. 9 is an enlarged view in vertical section upon the line $x\ z$ of Fig. 7. Fig. 10 is a view upon the same section as Fig. 9, showing the same parts with a heel-blank glue or paste applying device. Fig. 11 is an enlarged view in horizontal section on the line $z\ z$ of Fig. 1, showing the position of the heel-blank-feeding devices when the heel-blank is in position for attachment to the soles of a boot or shoe. Fig. 12 represents the same section, showing a top lift fed into position for attachment to the previously-attached heel-blank. Figs. 13 and 14 are detail views to illustrate a device for preventing the movement of the treadle to start the machine if the nails have not been properly fed or delivered to the nail-carrier. Fig. 15 is a detail view to illustrate a part of the treadle mechanism. Fig. 16 is a view of the under side of the top-lift feeding and spanking plate. Figs. 17 to 27, inclusive, represent the operative parts in various positions, to which reference will hereinafter be made. Fig. 28 is a view in elevation of a portion of the mechanism for rotating the head carrying the awls, drivers, &c. Fig. 29 is a view in vertical section to illustrate the cam and connecting devices for moving the jack.

A is the cross-head of the machine. It has each end squared at $a$ to fit the ways or guides $a'$ in the side frames $A'\ A^2$, and it is provided with a reciprocating movement by means of crank-wheels $a^2$ on the shaft $a^3$ and the connecting-rods $a^4$, which are outside the side frames $A'\ A^2$. (See Fig. 11.) The crank-shaft $A^3$ is rotated by the gear-wheels $a^5$ thereon and the pinions $a^6$ on the main shaft $a^7$. This shaft carries the fly-wheel $a^8$ and pulley $a^9$, which is made a part of the fly-wheel and forms one member of a friction-clutch. The other member $a^{10}$ of the clutch has a slight lengthwise movement upon the shaft $a^7$, and is adapted to be moved into engagement with the driving member of the clutch by means of the treadle $a^{11}$ and the wedge $a^{12}$, carried at the inner end thereof, which is adapted to be moved upward between the abutment or stationary block $a^{13}$ and the roll $a^{14}$ on the rod $a^{15}$, which is connected at $a^{16}$ to the lower end of the lever $a^{17}$, so that upon the upward movement of the wedge $a^{12}$ the lower end of the lever $a^{17}$ is drawn or moved inward in opposition to the stress of the coiled spring $a^{18}$, which surrounds the rod $a^{15}$. The lever $a^{17}$ is pivoted at $a^{19}$, and it is connected at $a^{20}$ with the hub of the movable member $a^{10}$ of the clutch. Its upper end has a cam-roll $a^{21}$, that bears against the edge of a cam $a^{22}$ of the cam-shaft. This cam $a^{22}$ is adapted upon the movement of the roll $a^{21}$ from a notch in the cam upon the starting of the machine to bear or come in contact with the roll and hold the section $a^{10}$ of the clutch in contact with the driving-section until the cam-shaft has made an entire revolution and until the cam comes opposite the roll $a^{21}$, when the spring $a^{18}$ acts to throw the lower end of the lever outward and the upper end inward, thereby disengaging the section $a^{10}$ of the clutch from the driving-section thereof. The treadle, after the starting of the machine or the removal of the foot, is automatically returned by a spring to its original position, so that the wedge-block $a^{12}$ is moved downward sufficiently to admit the spring $a^{18}$ to operate.

The main shaft $a^7$ is connected with the cam-shaft B by means of the pinion $b$ on the main shaft $a^7$, the intermediate gear $b'$, pinion $b^2$, and the gear $b^3$ on the cam-shaft, which meshes with the intermediate pinion $b^2$.

C is the jack. It comprises the plate $c$, a hollow post $c'$, and a spindle or rod $c^2$, which receives or holds at its upper end the last or work-support $c^3$. The jack also comprises a boot or shoe centering and holding device C', which is mounted upon the plate $c$ and is attached to the spindle $c^2$ to move vertically therewith. This boot or shoe centering device comprises three arms—namely, the side arms $c^4$ $c^5$ and the rear arm $c^6$. The side arm $c^4$ is pivoted at $c^7$ and the side arm $c^5$ at $c^8$ to nut-blocks $c^9$, and these blocks are guided in ways $c^{10}$ and are made movable toward and from each other therein by a right-and-left screw $c^{11}$. The lower ends of the arms $c^4$ $c^5$ are connected with each other and with an operative lever or arm $c^{12}$ by means of the links $c^{13}$ $c^{14}$. The arm or lever $c^{12}$ operates to straighten the links and throw inward the upper ends of the arms $c^4$ $c^5$ and at the same time to automatically lock them in that position by the straightening of the toggle. The rear arm $c^6$ is bent, as represented in Fig. 4. It is pivoted at $c^{15}$ to a support or stand $c^{16}$, and it is moved inward by means of the link $c^{17}$, which is connected to the lever or handle $c^{12}$, whereby upon the downward movement thereof to straighten the toggle the upper end of the arm $c^6$ is thrown inward. The said arms $c^4$ $c^5$ carry at their upper ends the adjustable centering-blocks $c^{18}$, which may have thin edges to enter the rand-crease of the boot or shoe. The rear arm $c^6$ carries a horizontally-adjustable heel-stop $c^{19}$, which may also have a thin edge to enter or extend into the rand-crease. The stand $c^{16}$ is connected with the jack-spindle by means of the block $c^{20}$, held in a socket $c^{21}$, formed in the jack-plate $c$, and the arm $c^{22}$, which is fastened to the spindle and to the block $c^{20}$, passing through a slot in the jack-post $c'$, so that upon the movement of the jack-spindle $c^2$ the shoe-centering device is moved with it. The jack-spindle $c^2$ extends downward below the bed-plate $C^2$, upon which it is arranged to be moved horizontally, and the bed $c^2$ has a hole $c^{23}$ to permit the movement of the jack and its spindle. The jack is adapted to be moved upon the bed in guides formed thereon and is secured thereto by cap-plates, which overlap the edges of the plate. (See Fig. 5.) There is fastened to the lower end of the jack-spindle a yoke $c^{24}$, (see Fig. 5,) which has inward-extending arms or sections $c^{26}$, which fit a corresponding recess formed about the toggle-head D. As the jack is moved horizontally, the jack-spindle is moved on and off the toggle-head D, and when in operative position thereon it preferably should be connected therewith, so that the last or work-support will be drawn downward positively as well as moved upward. Of course this downward movement can be obtained by a spring only, and in Fig. 3 I have shown a spring $c^{27}$ for obtaining this downward movement; but it is a better construction to connect the spindle with the toggle-head in a positive manner.

Before describing the movements of the last or work-support given it by the toggle-head D and its cam I will describe the templet and manner of its operation, the heel-blank and top-lift feeds, and the nail making and feeding devices.

The templet-plate E is a plate supporting at its front end a removable templet-block $e$, or it may be solid and have templet-holes formed therein. It must be made sufficiently strong to withstand the upward pressure of the toggle-head in the act of compressing the heel-blank, and it must be supported by a bed sufficiently strong to hold it rigidly in place during the compression of the heel-blank.

E' is the bed, and to it are bolted the heavy cap-plates $e'$ $e^2$, which lap upon the upper surface of the templet and also upon the upper surface of the nail-carrier $E^2$ and furnishes the guides thereof. The bed E' extends across the machine between the two side frames A' A², and is solidly made and fastened to the plates and suitably braced.

The templet-plate E is automatically moved by means of the cam-groove $e^3$ in the cylinder-cam upon the cam-shaft B and the rock-shaft $e^4$, having an arm $e^5$ at its lower end provided with a cam-pin to enter the groove of the cylinder-cam and an arm $e^6$ at its upper end, and which is connected at its end with the end of the templet-plate. The cam $e^3$ preferably is constructed to move the templet from an inoperative position to an operative position at the front of the machine upon the outward movement of the jack and completion of the breasting of the heel, so that when the machine is started the templet is in operative position, and it remains in this position during the compressing of the heel-blank, the pricking of the holes therein, the feeding and driving of the nails, and the spanking of the top lift, and it is then withdrawn to permit the breasting-knife to be operated, and it is then returned to its normal position. The templet is moved simply to permit the breasting-knife to be operated, and if no breasting-knife is used the templet will be stationary.

The nail-carrier plate carries at its front end the removable nail-holder block $e^7$, and it is moved by means of a cylinder-cam $e^8$ upon the cam-shaft B, the rock-shaft $e^9$, having an arm $e^{10}$ at its lower end provided with a cam-pin which enters the groove of the cylinder-cam, and an arm $e^{11}$ at its upper end, the end of which is connected with the nail-carrier plate. The cam is constructed to hold the plate back until after the awls have been reciprocated through the holes in the templet to form the holes in the heel-blank, when it moves the plate forward to a position to bring the holes of its nail-holder in register with the holes of the templet, and it holds the plate in this position during the operation of the drivers, and it then, after the drivers have left the holes of the nail-holder, moves the nail-holder plate backward sufficiently far to bring the holes in the holder in line with the holes of the distributer $E^3$, and having received nails from the distributer it is moved forward a very little to permit the slide-plate $e^{12}$ of the distributer to close the holes therein, and the cam then holds the nail-carrier plate in this position until it is again moved forward to deliver nails to the templet as before.

The heel-blanks are held in a box or receptacle F, and they are moved therefrom one by one by means of the feed plate or block $f$, adapted to be moved in the guideway $f'$ to a position to deliver the heel-blanks to the pocket $f^2$. This slide plate or block extends above the surface of the feedway $f^3$, along which the heel-blank is moved only sufficiently to engage the breast of the heel-blank, and it has an inclined upper surface $f^4$, whereby upon its outward movement it lifts the heel-blanks in the box, and thus rides under them to engage the next blank in order. The pocket $f^2$ is formed by the plate $f^5$, which preferably is adjustable, and the walls $f^6 f^7$ of the heel-blank-carrier plate F' and the inner surface of the section $f^8$ of the blank-holding arm $f^9$. The plate $f^5$ preferably is vertically adjustable by means of the screw-stud $f^{10}$ and adjusting-nut $f^{11}$. The heel-blank-carrier plate F' has the front arm $f^{12}$, the back arm $f^{13}$, and the rear connecting-section $f^{14}$. The arm $f^{12}$ provides the wall $f^7$ of the pocket, and also holds the gage-plate $f^{15}$, which has the inclined inner edge $f^{16}$. This gage-plate is made adjustable in relation to the arm $f^{12}$ by means of the screw $f^{17}$, which is adapted to screw in a threaded hole in the arm $f^{12}$ and is connected by a swivel-joint with the gage-plate. The gage-plate also has the guide studs or pins $f^{18}$, which enter guide-holes in the arm $f^{12}$. To the rear end $f^{14}$ of the plate is attached an arm $f^9$. This not only has the curved section $f^8$, but also the heel-grasping end $f^{19}$. This arm is pivoted at $f^{20}$ to the back section $f^{14}$ of the plate, so as to be movable toward and from the surface $f^7$ and the surface of the gage $f^{15}$. The inner surface of the end section $f^{19}$ is adapted to bear against the curved rear end of a heel-blank, and is therefore curved and shaped to center it, and it holds the heel-blank against the gage-plate by means of a spring $f^{21}$, which is fastened to the arm $f^{13}$ of the plate and bears against the outer surface of the arm $f^9$. The heel-blank-feeding plate F' is moved at a right angle to the line of movement of the feed block or plate $f$ in a suitable recess or guideway in the bed E', and it is so located that it moves the heel-blank laterally directly under the templet and over the heel end of a boot or shoe. In order that the heel-blank may be advanced to a position from which the plate can thus move it under the templet and over the boot or shoe, it is necessary to provide a heel-blank-holding device in the said recess or passage which shall operate to hold the heel-blank after it has been moved toward the templet by the movement of the blank-feeding plate, and I have represented for accomplishing this purpose a spring lock or latch $f^{22}$, which is fastened to an adjustable block $f^{23}$, arranged to slide in the plate $f^{24}$. (See Fig. 9.) This block is adjustable by means of a screw $f^{25}$, which passes through the lug or projection $f^{58}$, formed on the block, and turns in the lug $f^{26}$, extending down from the front end of the plate $f^{24}$. This latch or lock $f^{22}$ has the inclined surface $f^{27}$ and the shoulder $f^{28}$, and it has a vertical movement or movements in relation to the surface of the plate $f^{24}$, so that a heel-blank upon its outward movement or movements toward the templet causes the latch to be moved downward or depressed until it has been moved by or past the shoulder $f^{28}$, when the latch $f^{27}$ lifts behind it and holds it and prevents it from being moved backward upon the reverse movement of the feed-plate. This position of the heel-blank is well shown in Fig. 19. The latch or locking device therein shown is of a somewhat different construction from the one described and which is shown in Fig. 9, and the difference in construction is owing to the fact that the construction represented in Fig. 19 includes a device for applying glue or paste to the under surface of the heel-blank.

The plate $f^{24}$ is mounted upon a post or spindle $f^{29}$, which is movable downward in opposition to the stress of the coiled spring $f^{30}$, and the extent of upward movement of the plate $f^{24}$ in relation to the surface $f^{31}$ is regulated by means of a screw $f^{32}$ on the end of the spindle $f^{29}$ and the nut $f^{33}$. The office of this plate $f^{24}$ is to hold the heel-blank pressed against the surface $f^{31}$ while the grasping-arm $f^{19}$ is engaging it, in order that the heel-blank may be truly centered and passed in a perfectly-flat position to a position beneath the templet.

I would here say that the heel-blanks are fed from the stack F with a progressive movement and not by a continuous one—that is, a heel-blank is first fed to the pocket, and it is then advanced by the heel-blank-feeding plate F' toward the templet and in a position to be engaged and held by the latch or holding device $f^{22}$, and while it is being advanced to this position the carrier F' is moving from this position a heel-blank previously placed or moved thereon to a position under the templet. Upon the reverse movement of the carrier F' the heel-blank remains stationary, held by the lock or holding device, while the plate returns to its original position, and this brings the gage $f^{15}$ and holding-section $f^{19}$ of the arm $f^{8}$ into position to engage the heel-blank, and also the pocket into a position to receive another heel-blank from the heel-stack, and upon the next operation of the machine the heel-blank then held by the arm $f^{19}$ and gage is moved forward under the templet. The yielding plate $f^{24}$ also has an inclined surface or edge $f^{34}$. It is obvious that the surface $f^{31}$ must not be above the under surface $f^{35}$ of the templet-plate as the heel-blank is moved off this surface upon the surface of the templet-plate. The plate $f^{5}$ is made adjustable in order that the pocket may receive heels varying in height, and the level of the yielding plate $f^{24}$ is varied in order that the lower edge of the inclined surface $f^{34}$ shall always be below the surface of the plate $f^{35}$. The plate $f^{24}$ must always be set so that the distance between its surface and the surface $f^{31}$ shall be less than the height of the heel-blank. In some cases it is desirable to release this upward pressure upon the heel-blank immediately before it is fed outward under the templet, and this is accomplished by means of the block $f^{36}$, attached to the bed E' and having a hole through which the spindle $f^{29}$ passes, and a spirally-inclined surface $f^{37}$ and the lever $f^{38}$, having a hole through which the spindle $f^{29}$ passes, and a spirally-inclined surface $f^{39}$, which bears against the surface $f^{37}$. This lever $f^{38}$ is adapted to be turned upon the spindle $f^{29}$ by a cam and connecting mechanism (not shown) timed to move it downward as the heel-blank is moved out. This prevents any dragging action of the heel-blank on the surface $f^{31}$ and upon the upper surface of the plate $f^{24}$ as it is moved into position under the templet.

To apply glue, paste, or other adhesive composition to the heel-seat of the heel as it is moved from the stack to a position beneath the templet, I use a roll $f^{40}$, (see Figs. 10 and 19,) carried by arms extending from the yielding plate $f^{24}$ and arranged to be revolved in the tray or trough $f^{41}$, adapted to carry glue, paste, or other adhesive composition. The upper surface of this roll $f^{40}$ extends slightly above the upper surface of the plate $f^{24}$. The trough is supplied with glue, cement, or other adhesive substance in any desirable way. The movement of the heel-blank over the roll as it is fed forward causes it to be revolved and a coating of glue or other adhesive material to be applied to its under surface or heel-seat. When this glue-applying device is used, the latch or holding device $f^{22}$, instead of being attached to the plate $f^{24}$, is secured to the plate $f^{5}$. (See Figs. 10 and 19.) The heel-blank-carrying plate F' is moved by a cam-groove $f^{42}$ in the flat cam $f^{43}$ on the main shaft B, the rock-shaft $f^{44}$ having an arm $f^{45}$, which is attached to a slide-block $f^{46}$, having a cam-pin to enter a cam-groove $f^{42}$ and arranged to slide upon the support $f^{47}$. The rock-shaft $f^{44}$ has at its upper end an arm $f^{48}$, the end of which is connected with the back section of the heel-blank-carrier plate F'. The cam is constructed to hold the carrier grasping a heel-blank and centering it beneath the templet at the starting of the machine and during the compression of the heel-blank against the under surface of the templet by the upward movement of the last or work-support. It then moves the plate back to a position to bring its pocket in line with the slide-plate $f$ and the section $f^{19}$ of its holding-arm and the gage $f^{15}$ in proper relation to a blank previously fed beyond the latch or lock $f^{22}$, and it then remains stationary until the heel-blank has been breasted and the jack is being moved out of position, when it is moved forward to feed or move another heel-blank into position beneath the templet and to hold it there preparatory to attachment to the next boot or shoe, and at the same time to move outward the heel-blank from the pocket to a position beyond the latch $f^{22}$. It will be seen from this statement that the machine stops with a heel-blank beneath the templet in position for immediate attachment to the boot or shoe, so that the operator may know before he starts the machine that a heel-blank is in proper position for attachment. The plate or slide $f$ is moved at the necessary times by means of the link or rod $f^{49}$, lever $f^{50}$, pivoted at $f^{51}$, and the link $f^{52}$, extending to the arm $f^{53}$, fastened or secured to the rock-shaft $e^{9}$. The heel-blank plate F' may have its front section covered by a plate extending across from the arm $f^{13}$ to the arm $f^{12}$, in which case it would be necessary to provide the plate with perforations and to change the time of the cam, so that the plate shall be held outward beneath the templet or shall not be withdrawn from beneath the templet until the attaching-nails have been driven. The holes in this added plate would of course correspond substantially with the holes of the templet. The slide-plate $f$ is adjustably secured to the end of the link or rod $f^{49}$ by means of a bolt and slot. The latch or holding device $f^{22}$ is made adjustable in relation to the gage $f^{15}$ of the heel-carrier plate F' to assist in properly locating heels varying in size. For a small heel it should be set outward, and for a large heel inward.

G is a box holding top lifts in stack, and they are fed one by one by means of the slide-plate $g$, which is similar in shape and operation to the slide-plate $f$ of the heel-blank-feeding devices. It has an inclined surface $g'$, is movable in the ways $g^2$, and is adapted to feed the lifts one by one through the passage $g^3$ to a pocket $g^4$ beneath the top-lift-carrier plate G'. The top-lift-carrier plate is shaped in plan substantially as shown in Fig. 7, and its under side is shown in Fig. 16. It has a top-lift-grasping arm $g^5$, an abutment or shoulder $g^6$, extending downward, and an adjustable gage $g^7$, having the inclined ends $g^8$, (see Fig. 16,) and adjustable on the plate by means of the locking-screw $g^9$ and slot $g^{10}$. The pocket $g^4$, into which the top lifts are fed, is formed by the surface $g^{11}$, (see Fig. 8,) the surface $g^{12}$ of the arm $g^5$, the under surface $g^{13}$ of the top lift plate, and the vertical face $g^{14}$ of the latch $g^{15}$. (See Fig. 16.) The top lift is fed from this pocket by the movement of the top-lift plate G' to a position in front of the latch or holding device $g^{16}$. This latch is movable vertically, and is fastened by a screw $g^{17}$, and has a slot by which its horizontal position may be varied. Its arm $g^{18}$ is held in a groove or recess below the upper surface of the bed $g^{11}$, and it has the inclined surface $g^{19}$. This outward movement of the plate G' causes the top lift to move the latch $g^{16}$ downward until the top lift has been moved by it, when it automatically springs upward and forms a stop to prevent the lift from being drawn backward upon the reverse movement of the plate G.

$g^{20}$ is a yielding plate having an inclined surface $g^{21}$. It is adapted to press the top lift against the under surface of the plate G' and hold it there while it is being engaged by the outer section $g^{22}$ of the arm $g^5$. It has a stud $g^{23}$, which extends into the hole or socket $g^{24}$, and a spring $g^{25}$ is arranged to bear against the plate and hold it in an elevated position. In front of the plate $g^{20}$ is a roll $g^{26}$ for applying glue, cement, or other adhesive composition to the under surface of the top lift. This roll is mounted upon arms $g^{27}$, extending from the plate $g^{20}$, so as to be vertically movable therewith, and its upper surface extends slightly above the upper surface of the plate $g^{20}$. It is held in the trough $g^{28}$, which contains the glue or other adhesive composition, and is revolved upon the outward movement of the top lift over it, so that the coating or layer of glue or other adhesive composition is applied to the surface of the top lift as it is fed into a position for attachment to the heel-blank. This trough $g^{28}$ is removable from its holding-recess and is held in place therein by means of the spring-pin $g^{29}$, which enters a hole in the bottom of the trough, preferably arranged in line with the hole or socket $g^{24}$. (See Fig. 8.)

The top-lift plate G' is arranged on a line immediately below the templet-plate and is adapted to be moved outward beneath it, so that the templet-plate shall act to re-enforce it. It is therefore made quite thin, and it has a smooth continuous spanking-surface. It is moved by a cylinder-cam $g^{30}$ on the cam-shaft B, the rock-shaft $g^{31}$, having an arm $g^{32}$ provided with a cam-pin, which enters the cam-groove of the cylinder-cam, and an arm $g^{33}$ at its upper end, which is connected with the top-lift plate. The cam is constructed to hold the plate stationary until after the nails have been driven, when it moves the plate forward into position beneath the templet-plate and holds it there during the spanking of the lift, and then returns it to its original position.

The slide block or plate $g$ for moving the lifts from the stack to the pocket is given movements at the required times by means of the connecting rod or link $g^{34}$ and lever $f^{50}$. The block or plate $g$ is made horizontally adjustable upon the end or in relation to the end of the link $g^{34}$ by means of a bolt and slot. The top-lift-holding arm $g^5$ is arranged to bear against the rounded end of the top lift to center it against the gage-plate $g^7$ by means of a coiled spring $g^{35}$ upon the upper side of the plate attached to a pin $g^{36}$ and to a stud $g^{37}$, extending upward from the upper surface of the arm $g^5$ through a slot in the plate G'. This spring of course may be of any desired tension; but as it is desirable that the arm $g^5$ should bear against the edge of the top lift with considerable pressure during the outward movement of the plate while it is passing over the glue-roll, and that it should draw off easily from the top lift after the top lift has been spanked and upon the return movement of the plate and while it is moving by the next top lift in the order in which it has been advanced, as above stated, to a position in front of the latch $g^{16}$, (see Fig. 21,) I have embodied a device for automatically locking the arm $g^5$ with any desired degree of pressure upon the top lift at the end of the reverse movement of the plate G' and for automatically releasing it at the end of the outward movement. This locking mechanism comprises a block $g^{38}$, (see Fig. 16,) movable in a slot $g^{39}$ in the plate G', arranged to bear against the inclined surface $g^{40}$ of the arm $g^5$, and attached to the plate G' by a friction-plate $g^{41}$, and a screw which secures the plate $g^{41}$ upon the upper surface of the plate G' to the block $g^{38}$ below. This provides for the holding of the block in any position to which it may be moved. To move the block upon the reverse movement of the top-lift plate G' to cause the arm $g^5$ to be locked against the rear end of the top lift, I use a yielding stop $g^{43}$, (see Fig. 11,) which extends from the side frame of the machine and so that its end is in line with the block $g^{38}$, which comes in contact therewith at the end of the backward movement of the plate, and it is set against the arm $g^5$ with as much pressure as may be desired. The extent of this pressure is regulated by means of the spring $g^{44}$ and screw $g^{45}$. To move the block backward or away from the arm $g^5$ at the end of the outward movement of the plate G' and so as to release the arm $g^5$, I employ a stop $g^{46}$, (see Fig. 11,) which extends to a position to receive the block $g^{38}$ as it approaches the end of its outer movement. Of course both the yielding stop $g^{43}$ and stop $g^{46}$ are above the plate G'.

The nail making and distributing devices H are like those described in the Towns and Raymond patent, No. 346,137, of July 27, 1886, and need not further be described here, it being sufficient to say that they make nails automatically from wire and arrange them in groups or gangs in the distributer $E^3$ for delivery to the nail-carrier, and that the machine is automatically started by means of a cam projection $h$ on the cam-disk $f^{48}$, the push-pin $h'$ lifted by said cam $h$, the lever $h^2$, and the push-rod $h^3$. The cross-head A carries the revolving head H', which has an arm $h^4$, carrying a gang or group of awls $h^5$, and the arm $h^6$, carrying a gang or group of drivers $h^7$, and an arm $h^8$, and an arm $h^9$, supporting the heel-breasting knife $h^{10}$. The head is mounted upon the shaft $h^{11}$, and it is rotated by a device which is a variation of that described in the Henderson and Raymond patent, No. 317,647, of May 12, 1885, and is adapted to turn the head a quarter-revolution during the upper part of the upward movement of the cross-head. It comprises the guiding or cam ways 1 2 3 and a latch-block 4. The cam-guideway 1 has a curved turning-surface 5. The camway 2 is straight, and the lower part serves to hold the rotary head locked in any desired position while it is being moved in the lower part of its reciprocation. The camway 3 provides an escape for the cam-pins in succession from the straight camway 2 as the head is rotated. The latch-block 4 is reciprocated by means of the cam-guides 6 in a cam-plate carried by the cross-head, the block having a cam-pin 7, which enters said guides. These cams 6 cause the block 4 to be moved to permit the cam-pins to pass down by it upon the downward movement of the cross-head, and it is moved into position to close the passage upon the upward movement of the cross-head, so as to bring the barrier 8 in place against the cam-pin to bring its opposite cam in line with the curved guiding-surface 5, so that the head is partially rotated before this other cam-pin comes in contact with the curved guiding-surface 5. These cam-pins, which are numbered 9, are attached to a disk fastened to the shaft $h^{11}$. The revolving head has the friction-disk I attached to the end of the shaft $h^{11}$ to bear against the outer surface of the cross-head. The toggle-head D is supported in part by the bed-plate $d$, and it is attached or secured to the screw-rod $d'$ so as to be vertically adjustable thereon, the head having the screw-hole $d^2$, which receives the upper end of the rod $d'$, which is provided with a screw-thread, and the head also having the long teeth $d^3$, (see Fig. 1,) which in effect make that section of it a long cog and which are engaged by the teeth of the adjusting gear-wheel $d^4$, (see Fig. 1,) which is mounted upon a shaft which extends upward through the bed-plate $C^2$ and has upon its upper end a turning-wheel $d^5$. By turning the cog-wheel $d^4$ it will be seen that the height of the head D in relation to the screw-spindle $d'$ is varied and that, also, by providing the head with the long teeth $d^3$ it may be moved vertically without becoming disengaged from the adjusting-wheel $d^4$, which is not moved vertically. The spindle $d'$ is moved vertically in a hole in the stand $d^6$ by means of the toggle $d^7 d^8$, the link $d^9$, the lever $d^{10}$, pivoted at $d^{11}$ to the stand and having the arm $d^{12}$, which carries the cam-pin $d^{13}$, which enters the cam-groove $d^{14}$ in the cam-disk $d^{15}$ on the cam-shaft. The cam preferably is timed to give the toggle-head D, and therefore the last or work-support, the following movements and periods of rest: First, an upward movement to compress the heel-blank against the templet. This movement should be completed before the awls have entered the stock in order that the heel-blank may be fully compressed before the driving of the awls in order that the awls may not be deflected by lateral movement of the heel caused by vertical compression. This upward movement is followed by a period of rest, during which the heel-blank is held compressed against the templet-plate and the nails are fed and driven. The toggle-head is then moved down, moving the heel-blank away from the templet-plate to permit the feeding of the top lift into position below the templet-plate, and it is then immediately moved upward against the top-lift plate and templet to spank the top lift upon the ends of the projecting nails. It is then preferably immediately moved downward to allow the top-lift plate to be withdrawn, then upward to meet the downward movement of the breasting-knife, and then downward to its original position. The jack C is automatically moved outward at the end of the nailing operation by means of the bar N, lever $n$, and a cam projection $n^2$ on the cam-disk $n^3$. (See Fig. 29.)

In Figs. 13 and 14 I illustrate a device or detector for indicating if nails have not properly entered the nail-carrier from the nail-holder $E^3$, and it comprises an arm M, arranged to be moved horizontally between the nail-holder $E^3$ and the nail-carrier $e^7$ immediately before the machine is set in operation, and which preferably is connected with the treadle $a^{11}$ in such a manner that it serves to prevent its downward movement in case the arm shall not be moved entirely across the lines upon which the nails drop from the nail-holder; or, in other words, if one or more nails should project either from the carrier or from the holder into its path its movement is arrested and the treadle cannot be moved downward, and the machine therefore cannot be set in operation until the obstructing nails have been removed. This I consider to be a desirable feature of the invention, because it provides for the detecting of any accident, disturbance, or error in the delivery of the nails to the nail-carrier $e^7$ before the machine has been started and indicates this to the operator, and this relieves the operator from the care of looking after this part of the machine, and also prevents accident, as the nail-carrier $e^7$ cannot be moved into position unless its holes have been properly supplied with nails properly delivered to it or with no nails at all.

I have represented the detector-arm M as arranged to be moved upon the center $m$; but I would here remark that it can be arranged to slide instead of to swing upon a center, if desired. It is connected with the treadle by the shaft $m'$, which carries at its lower end the lever $m^2$, arranged to extend beyond the lower surface $m^3$ of the rear end of the treadle $a^{11}$. The arm $m^2$ is also attached to a swinging latch $m^4$, which is pivoted at $m^5$ and is adapted to be moved by the spring $m^6$ to a position over the upper surface of the end $m^3$ of the lever, so that when the latch is in this position—that is, over the inner end of the treadle—the front end of the treadle cannot be depressed or moved downward and the machine cannot be set in operation. In order to set it in operation it is necessary to remove the latch $m^4$. To do this, it is necessary to move the arm $m^2$ laterally, and this cannot be done unless the detector-arm M shall also be moved, and if the detector comes in contact with a nail or obstruction the movement of the arm $m^2$ is stopped and the latch is still held in locking position over the treadle. To remove the latch, therefore, it is necessary that the lever $m^2$ be given a movement sufficient to cause the detector-arm M to be moved entirely across the upper surface of the nail-carrier. This movement is given the lever $m^2$, when there is no obstruction in the path of the detector M, by means of the movable push bar or button $m^7$, carried at the front end of the treadle $a^{11}$ by a spring or spring-arm $m^8$, which serves to hold it in an elevated position in relation to the upper surface of the treadle $a^{11}$. The downward movement of the push-bar (which has an inclined edge) throws the lever $m^9$, which is pivoted at $m^{10}$ to the treadle, horizontally, so that its end $m^{11}$ comes in contact with the arm $m^2$ and moves the latch $m^4$ from engagement with the treadle and permits the treadle to be depressed to start the machine.

When there is an obstruction in the path of the detector M—that is, when a nail projects above the carrier-plate or spans the space between the holder $E^3$ and the carrier—then the movement of the detector M is arrested by the nail and the push bar or button $m^7$ cannot be moved downward far enough to throw the latch $m^4$ from contact with the operating-treadle, so that the treadle is held locked and the machine cannot be started.

Instead of connecting the detector M with the treadle, it may be connected with the sliding jack, in which case the movement of the jack would be arrested if there were any obstruction to the movement of the detector M; but the free movement of the jack into position would indicate that the detector had passed between the holder and the carrier $e^7$ and that no obstruction existed.

In operation the operator places the unheeled boot or shoe upon the last or work-support, which is moved out to the front of the table, and locks it the last or work-support by the side clamps $c^{18}$ and rear clamps $c^{19}$. The last is then moved into position, the yoke $c^{24}$ engaging the toggle-head and the jack-spindle being over the toggle-head. (See Fig. 17.) The machine is then set in operation and the work-support, with the boot or shoe, is moved upward against the heel-blank, which has been previously automatically fed into position beneath the templet-plate, (see Fig. 18,) and the heel-blank is compressed against the templet-plate. Upon the completion of the compression of the heel-blank the awls enter the heel-blank and are withdrawn. The attaching-nails are then automatically fed (see Fig. 19) and the drivers moved downward, (see Fig. 20,) driving the nails through the templet into the compressed heel-blank and into the sole of the boot or shoe. The drivers are then immediately moved upward and the last or work-support downward with the attached heel, the top lift immediately moved by the top-lift plate under the templet-plate, (see Fig. 21,) and the last or work-support immediately returned to bring the heel-blank against the top lift, which is held by the top-lift-holder plate and which by this movement spanks on the heel-blank. (See Fig. 22.) The last, with the work thereon, is immediately lowered and the top-lift plate is withdrawn. The templet is also withdrawn, the nail-carrier plate having been previously withdrawn to the nail-holder. (See Figs. 23 and 24.) The breasting-knife meanwhile has been brought into position by the rotation of the head and is then reciprocated, the last being moved upward to meet it. (See Fig. 25.) The last is then moved downward by the toggle, (see Fig. 26,) and immediately at the end of the movement the jack is moved forward automatically to the front of the table C. (See Fig. 27.) Simultaneously with this movement the heel-blank to be attached to the next boot or shoe is fed into position beneath the templet, which is moved forward to an operative position at the same time. The upward movement of the cross-head causes the revolving head to be rotated, so that the awls are brought into operative position.

If desired, the paste or glue rolls of the heel-blank and top-lift gluing apparatus may be positively rotated by means of a rack carried on the heel-blank carrier and top-lift carrier, respectively, and the pinion upon each of said rolls, with which the racks are respectively adapted to engage.

Having thus fully described my invention, I claim and desire to secure by Letters Patent of the United States—

1. The combination, in a heel-nailing machine, of the jack C, having the spindle $c^2$, with the toggle-head D, the toggle $d^7$ $d^8$, the link $d^9$, the lever $d^{10}$, and the cam $d^{15}$, having the cam-groove $d^{14}$, substantially as described.

2. In a heel-nailing machine, the combination of the toggle-head D, having the screw-threaded hole, with the screw-threaded spindle $d'$, the guide-plate $d$, and the stand $d^6$, and toggle $d^7$ $d^8$, substantially as described.

3. In a heel-nailing machine, the combination of the head D, having the screw-threaded hole, the screw-threaded spindle $d'$, the teeth $d^3$ upon the toggle-head, and the adjusting cog-wheel $d^4$, as and for the purposes described.

4. In a heel-nailing machine, the combination of the screw-spindle $d'$, the toggle-head D, having the screw-hole and provided with the teeth $d^3$, the cog-wheel $d^4$, its shaft extending above the table $C^2$, and the turning-wheel $d^5$ above the table $C^2$, substantially as described.

5. In a heel-nailing machine, the combination of the toggle-head D, having the groove or recess $c^{26}$, with the jack-spindle having grasping-arms $c^{24}$, which enter the groove $c^{26}$ and connect the spindle to the head, substantially as described.

6. In a heel-nailing machine, the combination of the templet-plate E and templet $e$ with the heel-blank transferrer, comprising the heel-blank-carrier plate F′, having heel-blank-holding devices adapted to be moved beneath the templet-plate, the last or work-support mounted upon a movable spindle, and a movable head D for forcing the last or work-support upward to compress the heel-blank against the under surface of the templet, substantially as described.

7. In a heel-nailing machine, the combination of the heel-blank-transferring plate F′ with devices, substantially as described, for simultaneously moving two heel-blanks, one from the diaphragm or support $f^{24}$ to a position under a templet and the other from the pocket $f^2$ to a position over the diaphragm or support $f^{24}$, substantially as described.

8. In a heel-nailing machine, the combination of the transferrer-plate F′ with the pocket $f^2$ and the adjustable plate $f^5$, substantially as described.

9. In a heel-nailing machine, the combination of the transferrer-plate F′, the pocket $f^2$, the receptacle or box F, and the heel-blank-feeding plate or block $f$ for moving the heel-blanks from the stack to the pocket, substantially as described.

10. In a heel-nailing machine, the combination of the plate F′ with the movable heel-blank arm $f^9$, having the heel-grasping section $f^{19}$, with the gage-plate $f^{15}$, substantially as described.

11. In a heel-nailing machine, the combination of the plate F′, having arms or sections $f^{12}$ $f^{14}$ $f^{13}$, with the gage-plate $f^{15}$, adjustably secured to the arms $f^{12}$, and the spring-arm $f^9$, having the heel-blank-holding sections $f^8$ $f^{19}$, substantially as described.

12. In a heel-nailing machine, the combination of the plate F′, the pocket $f^2$, the yielding diaphragm or plate $f^{24}$, and a stationary section of the machine, having the surface $f^{31}$, as and for the purposes described.

13. In a heel-nailing machine, the combination of the plate F′, shaped as described, the pocket $f^2$, the plate $f^{24}$, and a heel-blank-holding device for holding heel-blanks advanced by the plate F′ from the pocket upon the plate $f^{24}$ during the return movement of said plate, substantially as described.

14. In a heel-nailing machine, the combination of the upper table of the machine, having a pocket $f^2$, the carrier or transferrer plate F′, the plate $f^{24}$, and the latch $f^{27}$, substantially as described.

15. In a heel-nailing machine, the combination of the upper table of the machine, having a pocket $f^2$, the adjustable plate $f^5$, the carrier or transferrer plate F′, and the plate $f^{24}$, having the inclined surface or edge $f^{34}$, substantially as described.

16. In a heel-nailing machine, the plate $f^{24}$, having the inclined edge $f^{34}$, and the latch $f^{22}$, having the shoulder $f^{28}$ and the inclined surface $f^{27}$, substantially as described.

17. In a heel-nailing machine, the combination of the plate $f^{24}$ with the adjustable latch $f^{22}$, as and for the purposes described.

18. In a heel-nailing machine, the combination of the plate $f^{24}$, the latch $f^{22}$, held by the sliding block $f^{23}$, with the adjusting-screw $f^{25}$, substantially as described.

19. In a heel-nailing machine, the combination of the plate $f^{24}$, its spindle $f^{29}$, the spring $f^{30}$, a cam, and connecting mechanism for moving the plate in opposition to the spring immediately before the heel-blank is fed from the plate into position to release the friction of the plate thereon, substantially as described.

20. In a heel-nailing machine, the combination of the plate $f^{24}$, the spindle $f^{29}$, spring $f^{30}$, block $f^{36}$, having the spirally-inclined surface $f^{37}$, and lever $f^{38}$, as and for the purposes described.

21. In a heel-nailing machine, in combination with the templet $e$, templet-plate E, and nail-driving devices, a heel-blank carrier or transferrer, and a device, substantially as set forth, for applying cement, paste, or glue to the seat of the heel-blank as it is fed, substantially as described.

22. The combination, in a heel-attaching machine, of a heel-blank transferrer or carrier, an apparatus for applying glue, paste, or cement to the seat of the heel as the heel is fed by the carrier to the blank-attaching devices, a templet or pressure plate against which the heel is moved, and a last or support for holding a boot or shoe, having a movement toward and from the templet or pressure plate, as and for the purposes described.

23. The combination, in a heel-nailing machine, of the last or work-support, the templet $e$, and the herein-described apparatus for applying adhesive material to the heel-seat before the heel-blank is attached by the attaching devices, substantially as described.

24. The combination of the heel-blank compressing and nail-driving devices with a heel-blank transferrer and the herein-described apparatus for applying paste or other adhesive substance or material to the seat of the heel-blank, substantially as described.

25. The combination, with the heel-attaching devices, of the herein-described apparatus for applying glue or other adhesive substance to the heel-seat of the heel-blank, as and for the purposes described.

26. In a heel-nailing machine, the combination of the heel-blank-transferring plate F', the plate $f^{24}$, and the roll $f^{40}$ for applying glue or other adhesive material to the heel-seat of a heel-blank as it is passed over the same, substantially as described.

27. In a heel-nailing machine, the combination of the transferrer F', the yielding plate $f^{24}$, the paste-applying device $f^{40}$, carried thereby, and the paste or glue holding tray or receptacle $f^{41}$, substantially as described.

28. In combination with an organized heel-nailing machine, the herein-described apparatus for automatically applying cement, paste, or glue, or other adhesive substance to the heel-seat of a heel-blank, in the manner and for the purpose set forth.

29. In a heel-nailing machine, the combination of the plate F', the lever $f^{48}$, the rock-shaft $f^{44}$, and the cam $f^{43}$, connected with the rock-shaft, substantially as described.

30. In a heel-nailing machine, the combination of the last or work-support $c^3$, clamping devices, substantially as set forth, for clamping the boot or shoe to the last or work-support, carried by the jack-spindle $c^2$, the said spindle provided with a vertical movement in the post $c'$, and the said post $c'$, substantially as described.

31. In a heel-nailing machine, the combination, in a heel-attaching machine, of an unperforated carrier-plate having top-lift-grasping devices supported upon its under surface, comprising the spring-held arm $g^5$, shaped substantially as specified, with the abutment or gage $g^7$, and the cross-bar $g^6$, as and for the purposes specified.

32. The combination, in a heel-attaching machine, of a top-lift-carrier plate having two top-lift-holding devices and adapted to move two top lifts simultaneously in a direction toward the templet, with the top-lift-holding arm or device adapted to engage the second of the two lifts upon its backward movement and to hold it during the backward movement of the top-lift plate, as and for the purposes described.

33. The combination, in a heel-attaching machine, of a top-lift carrier having a gage-plate $g^7$ and a cross-bar $g^6$, with a holding device for holding one top lift against the gage and the other top lift behind the same while the two are being moved outward by the carrier, as and for the purposes specified.

34. The combination, in a heel-attaching machine, of a top-lift-carrier plate, a cam for moving it at stated intervals, a gage carried by the plate, against which the top lift is held by a movable clamping or holding device, and means, substantially as described, for locking the clamping or holding device against the top lift and for unlocking it at the end of its outward movement, whereby the top lift is held firmly clamped during its outward movement and the clamping mechanism then released, as and for the purposes specified.

35. The combination, in a heel-attaching machine, of the top-lift carrier, a gage or abutment, a movable holding device or arm for pressing the top lift against such gage or abutment, a spring connected with the said arm or holding device for providing it with adjustment, and an adjusting device for varying the tension of said spring, adapted to be set to increase the tension after a top lift has been moved into position to bring its breast against the gage and to be released at the end of the feeding movement of the top lift to a position over the attached heel, as and for the purposes described.

36. The combination, in a heel-attaching machine, of a top-lift plate having a top-lift-holding arm or device, and a spring arranged to lay hold of the same, with a tension-regulating device adapted to be automatically set, substantially as described, to increase the tension of the spring to cause the holder to bear against the top lift with greater pressure or force during the outward movement of the plate to release the tension at the end of said outward movement of the plate, all substantially as described.

37. The combination of a top-lift plate, the top-lift-holding arm or device carried thereby, a spring for producing tension thereon attached to said arm or holding device at one end, and a movable locking-block adapted to be moved against the arm or holding device to lock it against the top lift, with a latch-block-setting stop and a latch-block-releasing stop, as and for the purposes described.

38. In a heel-nailing machine, the combination of the arm $g^5$, the wedge-block $g^{38}$, and the stops $g^{43}$ $g^{46}$, substantially as described.

39. The combination, in a heel-attaching machine, of the top-lift carrier having the arm $g^5$, the locking-block $g^{38}$, and the block-releasing stop $g^{46}$, substantially as described.

40. The combination, in a heel-attaching machine, of the top-lift carrier, its top-lift-holding arm $g^5$, the locking-block $g^{38}$, and the yielding setting-stop $g^{43}$, substantially as described.

41. The combination, in a heel-attaching machine, of the top-lift carrier having the holding-arm $g^5$ and a block $g^{38}$ for locking the same, with the stop $g^{43}$, its spring $g^{44}$, and screw $g^{45}$ for adjusting the tension of the spring, as and for the purposes specified.

42. In a heel-nailing machine, the combination of the templet-plate E and templet $e$ with the top-lift carrier comprising a slide-plate having a top-lift-holding device and adapted to be moved beneath the templet-plate, the last or work-support mounted upon a movable spindle, and a movable head D for forcing the last or work-support upward to move the heel-blank against a top lift held against the under surface of said plate, substantially as specified.

43. The combination of the templet with a top-lift carrier, substantially as specified, provided with devices for simultaneously moving two top lifts, one from the plate or support $g^{20}$ to a position under the templet and the other from the pocket $g^4$ to a position over the said plate or support, substantially as described.

44. In a heel-nailing machine, the combination of the top-lift carrier, the pocket $g^4$, the box G for holding the top lifts in stack, and the top-lift-feeding plate or block $g$ for moving heel-blanks from the stack to the pocket, substantially as described.

45. The combination, in a heel-nailing machine, of the top-lift carrier having the pocket $g^4$, the yielding plate $g^{20}$, and a top-lift-holding device for holding the top lifts advanced by the carrier from the pocket upon the yielding plate $g^{20}$ during the return movement of said carriers, substantially as described.

46. In a heel-nailing machine, the combination of the top-lift carrier, the pocket $g^4$, plate $g^{20}$, and the latch or top-lift-holding device $g^{16}$, substantially as described.

47. In a heel-nailing machine, the combination of the top-lift carrier, the yielding plate $g^{20}$, and the latch $g^{19}$, and means, substantially as described, for providing it with horizontal adjustment, as and for the purposes described.

48. The combination of the templet $e$, a last or work-support and the pressure-head for moving it vertically in relation to the templet, nail-driving devices, a top-lift carrier or transferrer, and a device, as herein described, for applying cement, paste, glue, or other adhesive substance to the under surface of the top lift as it is fed, substantially as described.

49. In a heel-nailing machine, the combination of the top-lift carrier, the yielding plate $g^{20}$, the glue-applying device $g^{26}$, carried thereby, and the paste or glue holding receptacle $g^{28}$, substantially as described.

50. The combination, in a heel-attaching machine, of the top-lift carrier, and a removable tray or other receptacle arranged as set forth and adapted to carry glue or other adhesive material, and a glue-applying device, substantially as described, for transferring the glue from the receptacle to the inner surface of a top lift, as and for the purposes specified.

51. In a heel-attaching machine, the combination of the glue tray or receptacle $g^{28}$ with the frame of the machine, having a pocket or recess for holding the same, and a latch or locking device for locking the tray or receptacle thereto, as and for the purposes specified.

52. The combination, in a heel-attaching machine, of the top-lift carrier, the movable tray or receptacle $g^{28}$, the roll $g^{26}$, carried thereby, the yielding plate $g^{20}$, also supported thereby, and a latch or locking device for locking the tray or receptacle in position, substantially as described.

53. The combination, in a heel-attaching machine, of heel-nailing devices, a heel-blank carrier, and a device or apparatus, substantially as specified, for applying glue or other adhesive material thereto, arranged at the end of the passage or pocket from which the heel-blank is fed by its carrier and between it and the position to which the heel-blank is transferred by the carrier for attachment to the boot or shoe, as and for the purposes described.

54. The combination, in a heel-nailing machine, of the templet $e$, a jack having a vertically-movable post $c^2$, the last or work-support carried thereby, the toggle-head D, the toggle $d^7$ $d^8$, lever $d^{10}$, and cam $d^{14}$, and the reciprocating cross-head carrying a revolving head supporting a gang or group of awls, a gang or group of drivers, and a heel-breasting device, and means for automatically rotating said head, substantially as described.

55. The combination, in a heel-nailing machine, of a templet, a cam and connecting devices for providing said templet with a horizontal movement, a nail-carrier, a cam and connecting devices for giving it a horizontal movement, a jack having a vertically-movable post, a toggle-head and a cam for actuating it, a reciprocating cross-head carrying a head supporting a gang or group of awls, a gang or group of drivers, and means for automatically moving said awls and drivers successively into operative position, substantially as described.

56. The combination, in a heel-attaching machine, of a templet, an imperforate plate adapted to be automatically moved into and out of position beneath the templet, a jack having a vertically-movable spindle, and a movable head controlled in its movements by a cam constructed substantially as specified, all as and for the purposes described.

57. The combination of the slide-jack with the last or work-support and boot or shoe centering devices consisting of upwardly-projecting pivoted arms, as set forth, attached to the jack-frame and movable therewith, substantially as described.

58. The combination of the jack, its vertically-movable spindle, the last or work-support carried thereby, and boot or shoe centering devices consisting of upwardly-projecting pivoted arms, substantially as described, attached to the said jack-spindle to be movable therewith, as and for the purposes specified.

59. In a heel-nailing machine having an automatic nail-feed, a detector, substantially as described, arranged to be moved between the nail-supplying devices and the nail-carrier, as and for the purposes specified.

60. In a nailing-machine, in combination with the nail-carrier and with the nail-supplying devices, a detector, substantially as described, adapted to be moved over the nail-carrier between it and the nozzles or outlets of the nail-supplying devices, substantially as and for the purposes described.

61. The combination, in a heel-nailing machine, of nail-supplying devices, a nail-carrier, an operating-treadle, and a detector for the nail-carrier between it and the nail-supplying devices and connected with a latch or lock for locking the treadle and with an operating lever or device, whereby upon the movement of the detector across the carrier the latch or locking mechanism for holding the treadle is released and whereby, also, in case of obstruction to the detector the treadle is held locked, substantially as described.

62. In a heel-nailing machine, an operating-treadle, a nail-carrier, nail-supplying devices, and a detector, substantially as specified, arranged to be passed between the nail-carrier and nail-supplying devices and controlling the operation of the treadle, substantially as described.

63. In a heel-nailing machine, the combination of the detector M, adapted to be moved across the upper surface of the nail-carrier, its rod $m'$, and actuating-arm $m^8$, connected with said rod to turn the same, substantially as described.

64. In a heel-nailing machine, the combination of the operating-treadle $a^9$, the detector M, the latch or lock $m^4$, connected with the detector, the lever $m^9$, carried by the treadle $a^{11}$, and the actuating-arm $m^8$, connected with said treadle, whereby upon the downward movement of the said actuating-arm $m^8$ and upon the completion of the movement of the detector M the latch or lock $m^4$ is caused to be moved from contact with the treadle, substantially as described.

65. In a heel-nailing machine, the combination of the nail-carrier, the detector M, the rod $m$, the lever $m^2$, the swinging latch or lock $m^4$, connected with the said lever, the lever $m^9$, pivoted at $m^{10}$ to the treadle $m^{11}$, and the movable actuating-arm $m^8$, substantially as described.

66. The combination, in an organized heel-nailing machine, of the following instrumentalities: a templet, a nail-carrier and a cam for moving it automatically into and out of operative position, a heel-blank carrier and a cam for moving it into and out of operative position, a top-lift carrier and a cam for moving it into and out of operative position, a jack having a vertically-movable spindle, a toggle-head upon which the spindle is adapted to rest, and a cam for moving the toggle-head and spindle vertically in relation to the templet and the top-lift carrier, as described, a reciprocating cross-head, and a gang or group of awls and gang or group of drivers carried thereby and adapted to be automatically moved into and out of operative position, substantially as described.

67. The combination, in a heel-nailing machine, of a templet, a nail-carrier and a cam for moving it automatically into and out of operative position, a heel-blank carrier and a cam for moving it into and out of operative position, a jack having a vertically-movable spindle, a toggle-head upon which the spindle is adapted to rest, and a cam for moving the toggle-head and spindle vertically in relation to the templet and the top-lift carrier, as described, a reciprocating cross-head, and a gang or group of awls and gang or group of drivers carried thereby and adapted to be automatically moved into and out of operative position, and a reciprocating heel-breasting knife, substantially as described.

FREEBORN F. RAYMOND, 2D.

Witnesses:
J. M. DOLAN,
FRED. B. DOLAN.